US012720161B2

(12) United States Patent
Webb et al.

(10) Patent No.: US 12,720,161 B2
(45) Date of Patent: Aug. 25, 2026

(54) SYSTEM TO ESTABLISH A NETWORK OF NODES AND PARTICIPANTS FOR DYNAMIC MANAGEMENT OF MEDIA CONTENT RIGHTS

(71) Applicant: Turner Broadcasting Systems, Inc., Atlanta, GA (US)

(72) Inventors: Nicolas Paul Webb, McDonough, GA (US); Nishith Kumar Sinha, Mableton, GA (US)

(73) Assignee: Turner Broadcasting Systems, Inc., Atlanta, GA (US)

( * ) Notice: Subject to any disclaimer, the term of this patent is extended or adjusted under 35 U.S.C. 154(b) by 0 days.

(21) Appl. No.: 18/474,113

(22) Filed: Sep. 25, 2023

(65) Prior Publication Data

US 2024/0114210 A1 Apr. 4, 2024

Related U.S. Application Data

(63) Continuation of application No. 16/245,374, filed on Jan. 11, 2019, now abandoned.

(Continued)

(51) Int. Cl.
*H04N 21/4627* (2011.01)
*G06F 16/182* (2019.01)

(Continued)

(52) U.S. Cl.
CPC ..... *H04N 21/4627* (2013.01); *G06F 16/1824* (2019.01); *G06F 21/105* (2013.01);

(Continued)

(58) Field of Classification Search
None
See application file for complete search history.

(56) References Cited

U.S. PATENT DOCUMENTS 4,660,168 A * 4/1987 Grant ................. G06Q 20/1085 902/9
5,892,900 A * 4/1999 Ginter ..................... H04L 63/20 726/26

(Continued)

FOREIGN PATENT DOCUMENTS

WO WO-2007024596 A2 * 3/2007 ......... H04N 21/2543
WO WO-2011062529 A1 * 5/2011 ............. H04L 63/10

OTHER PUBLICATIONS

U.S. Appl. No. 16/245,374, filed Jan. 11, 2019.

(Continued)

*Primary Examiner* — Neha Patel
*Assistant Examiner* — Jahed Ali
(74) *Attorney, Agent, or Firm* — ALSTON & BIRD LLP

(57) ABSTRACT

The present disclosure discloses a system and method for establishing a network of nodes and participants for dynamic management of media content rights. The system comprises a plurality of nodes configured to interact with each other in accordance with a defined protocol, and a plurality of instances of a distributed media rights transaction ledger associated with a respective node in a communication network. At least one node associated with a corresponding participant interacts with one of remaining nodes of the plurality of nodes associated with a participant which owns media content and maintains control over enforcement of media content rights associated with the media content. A plurality of media content rights transactions between the plurality of nodes is managed by the plurality of nodes in accordance with the defined protocol and categorized and defined based on the defined protocol in each instance of the distributed media rights transaction ledger.

20 Claims, 5 Drawing Sheets

Related U.S. Application Data

(60) Provisional application No. 62/616,216, filed on Jan. 11, 2018.

(51) Int. Cl.

| | |
|---|---|
| ***G06F 21/10*** | (2013.01) |
| ***G06F 21/64*** | (2013.01) |
| ***H04L 9/06*** | (2006.01) |
| ***H04L 9/08*** | (2006.01) |
| ***H04L 9/32*** | (2006.01) |
| ***H04L 9/40*** | (2022.01) |
| ***H04L 67/10*** | (2022.01) |
| ***H04L 69/24*** | (2022.01) |
| ***H04N 21/2347*** | (2011.01) |
| ***H04N 21/442*** | (2011.01) |
| ***H04N 21/462*** | (2011.01) |
| ***H04N 21/472*** | (2011.01) |
| ***H04N 21/8352*** | (2011.01) |

(52) U.S. Cl.

CPC ............ *G06F 21/64* (2013.01); *H04L 9/0643* (2013.01); *H04L 9/0825* (2013.01); *H04L 9/0861* (2013.01); *H04L 9/3236* (2013.01); *H04L 9/3247* (2013.01); *H04L 63/126* (2013.01); *H04L 67/10* (2013.01); *H04L 69/24* (2013.01); *H04N 21/2347* (2013.01); *H04N 21/44222* (2013.01); *H04N 21/44226* (2020.08); *H04N 21/4622* (2013.01); *H04N 21/47202* (2013.01); *H04N 21/8352* (2013.01); *H04L 2209/603* (2013.01); *H04L 2463/101* (2013.01)

(56) References Cited

U.S. PATENT DOCUMENTS 5,915,085 A * 6/1999 Koved .................... G06F 9/468 726/1
7,209,892 B1 * 4/2007 Galuten ............. G06Q 30/0625 705/26.62
7,290,699 B2 * 11/2007 Reddy ..................... H04L 63/12 235/382
7,860,799 B2 * 12/2010 Russell ................ G06Q 20/382 709/224
8,145,908 B1 * 3/2012 Liu ....................... H04L 63/102 709/203
8,639,625 B1 * 1/2014 Ginter ..................... G06F 21/78 705/50
8,706,610 B2 * 4/2014 Fenichel ................ G06Q 40/04 705/37
9,100,814 B2 * 8/2015 Kjellberg ........... G06Q 20/1235
9,286,102 B1 * 3/2016 Harel .................. G06F 11/1402
9,342,661 B2 * 5/2016 Cholas ...................... H04L 9/32
9,596,513 B2 * 3/2017 Narasimhan ..... H04N 21/47202
9,715,581 B1 * 7/2017 Estes .................. G06Q 30/0204
9,922,328 B2 * 3/2018 Kumar ................... G06Q 40/12
10,531,131 B2 * 1/2020 Slaughter ............... G11B 27/10
10,594,689 B1 * 3/2020 Weaver ................. H04L 9/3231
2003/0172163 A1 * 9/2003 Fujita .................. H04L 67/1001 709/226
2004/0098350 A1 * 5/2004 Labrou .................. G06Q 20/12 705/64
2004/0253942 A1 * 12/2004 Mowry ............... H04L 63/0428 455/410
2005/0049886 A1 * 3/2005 Grannan ................ G06Q 30/06 705/902
2005/0188108 A1 * 8/2005 Carter ..................... H04L 45/02 709/239
2006/0047661 A1 * 3/2006 Chowdhury ........ G06F 16/9574
2007/0156726 A1 * 7/2007 Levy ....................... G06F 16/21
2008/0092181 A1 * 4/2008 Britt ..................... H04N 21/482 348/E7.071
2008/0249961 A1 * 10/2008 Harkness ......... H04N 21/44224 707/999.005
2008/0294775 A1 * 11/2008 Roberts .............. H04N 21/6118 709/225
2009/0144398 A1 * 6/2009 Reisman .................. G06F 8/65 709/219
2010/0058404 A1 * 3/2010 Rouse ................ H04N 21/2181 725/87
2010/0094833 A1 * 4/2010 Svendsen ................ G06F 16/48 707/705
2010/0110200 A1 * 5/2010 Lau .................... H04N 21/4325 348/207.1
2010/0114623 A1 * 5/2010 Bobbitt ............ G08B 13/19613 705/16
2010/0161829 A1 * 6/2010 Kumaran ............... G11B 27/10 709/233
2010/0198777 A1 * 8/2010 Lo ........................ G06F 16/283 707/E17.014
2011/0184871 A1 * 7/2011 Stahl ...................... G06Q 10/06 705/310
2012/0054246 A1 * 3/2012 Fischer .................. G06Q 10/06 707/E17.044
2012/0255027 A1 * 10/2012 Kanakapura ............ G06F 21/51 726/26
2013/0041748 A1 * 2/2013 Hsiao ..................... G06Q 30/02 705/14.41
2013/0046847 A1 * 2/2013 Zavesky ................ G06Q 10/00 709/217
2013/0054558 A1 * 2/2013 Raza ..................... G06F 16/951 707/769
2013/0239221 A1 * 9/2013 Conserva ............. H04N 21/835 726/26
2013/0254345 A1 * 9/2013 Kook ................ H04N 21/2402 709/219
2013/0268651 A1 * 10/2013 Greenzeiger ........ H04N 21/252 709/224
2014/0067596 A1 * 3/2014 McGovern ......... G06Q 30/0246 705/26.7
2014/0165209 A1 * 6/2014 Yin ........................ G06F 21/10 726/26
2015/0310188 A1 * 10/2015 Ford ..................... H04L 63/101 726/28
2015/0370909 A1 * 12/2015 Volach .................. H04L 67/306 707/722
2016/0210637 A1 * 7/2016 Kumar ................... G06Q 40/12
2016/0255139 A1 * 9/2016 Rathod ............. H04N 1/32101 709/203
2016/0260171 A1 9/2016 Ford et al.
2016/0321434 A1 * 11/2016 McCoy ................ G06Q 20/123
2016/0323109 A1 * 11/2016 McCoy ................ G06Q 50/184
2017/0116693 A1 * 4/2017 Rae ...................... G06Q 50/184
2017/0134161 A1 5/2017 Goeringer et al.
2017/0206523 A1 * 7/2017 Goeringer ............ G06Q 20/409
2017/0237686 A1 * 8/2017 Wang .................... H04L 47/783 709/219
2017/0245013 A1 * 8/2017 Wolff ................ H04N 21/4334
2017/0278186 A1 * 9/2017 Creighton, IV ..... G06Q 20/401
2017/0337534 A1 * 11/2017 Goeringer .............. G06Q 20/06
2017/0339438 A1 * 11/2017 Slaughter ........... H04N 21/8456
2018/0019867 A1 * 1/2018 Davis .................... H04L 9/3239
2018/0041571 A1 * 2/2018 Rogers ................. H04L 67/104
2018/0068091 A1 * 3/2018 Gaidar .................... G06F 21/16
2018/0082291 A1 * 3/2018 Allen .................... H04L 9/3239
2018/0115416 A1 * 4/2018 Diehl .................... H04L 9/0819
2018/0211524 A1 * 7/2018 Furuichi ............ G01C 21/3415
2018/0322259 A1 * 11/2018 Solow ................... H04L 9/0819
2018/0343131 A1 * 11/2018 George ................. G06F 3/0611
2019/0028278 A1 * 1/2019 Gilson .................. H04L 9/3247
2019/0130190 A1 * 5/2019 Raspotnik, Jr. ........... H04L 9/32
2019/0213304 A1 * 7/2019 Webb ...................... H04L 67/10
2019/0213633 A1 * 7/2019 Kokernak .......... G06Q 30/0277
2020/0012688 A1 * 1/2020 Vala ........................ G06F 3/167
2020/0068259 A1 * 2/2020 Gordon ............ H04N 21/23892
2020/0349613 A1 * 11/2020 Xi ...................... G06Q 30/0255

(56) References Cited

U.S. PATENT DOCUMENTS

2021/0192012 A1* 6/2021 Ohashi .................. H04L 9/0841
2024/0114210 A1* 4/2024 Webb .................... H04L 63/126

OTHER PUBLICATIONS

Corrected Notice of Allowance for U.S. Appl. No. 17/521,216 dated Jan. 5, 2023.
Corrected Notice of Allowance for U.S. Appl. No. 17/521,216 dated Oct. 5, 2022.
Coutinho et al., "Service-based negotiation for advanced collaboration in enterprise networks," Jan. 2014, Springer Science+ Business Media New York 2014 (Year: 2014).
Final Office Action for U.S. Appl. No. 16/245,374, dated May 25, 2023, (31 pages), United States Patent and Trademark Office, US.
Final Office Action for U.S. Appl. No. 16/245,374 dated Jun. 21, 2022.
Negru et al., "A Model for Collaborative Blockchain-Based Video Delivery Relying on Advanced Network Services Chains," IEEE Communications Magazine, vol. 55, No. 9, pp. 70-76, Sep. 2017.
Non-Final Office Action for U.S. Appl. No. 16/245,374 dated Nov. 12, 2021.
Non-Final Office Action for U.S. Appl. No. 16/246,249 dated Oct. 15, 2020.
Non-Final Office Action for U.S. Appl. No. 16/848,219 dated Apr. 5, 2021.
Non-Final Office Action for U.S. Appl. No. 17/521,216 dated Jun. 7, 2022.
Non-Final Office Action for U.S. Appl. No. 16/245,374 dated Oct. 31, 2022.
Notice of Allowance for U.S. Appl. No. 16/246,160 dated Mar. 5, 2020.
Notice of Allowance for U.S. Appl. No. 16/246,249 dated Feb. 12, 2021.
Notice of Allowance for U.S. Appl. No. 16/848,219 dated Dec. 22, 2021.
Notice of Allowance for U.S. Appl. No. 16/848,219 dated Jul. 15, 2021.
Non-Final Rejection Mailed on Feb. 27, 2024 for U.S. Appl. No. 17/340,200, 50 page(s).

* cited by examiner

SYSTEM TO ESTABLISH A NETWORK OF NODES AND PARTICIPANTS FOR DYNAMIC MANAGEMENT OF MEDIA CONTENT RIGHTS

CROSS-REFERENCE TO RELATED APPLICATIONS

This patent application is a continuation of U.S. patent application Ser. No. 16/245,374, titled "SYSTEM TO ESTABLISH A NETWORK OF NODES AND PARTICIPANTS FOR DYNAMIC MANAGEMENT OF MEDIA CONTENT RIGHTS," filed Jan. 11, 2019, which claims priority to U.S. Provisional Application Ser. No. 62/616,216, filed on Jan. 11, 2018, the entire contents of both of which are incorporated herein by reference.

FIELD

Certain embodiments of the disclosure relate to a media content rights management system for digital media and television content. More specifically, certain embodiments of the disclosure relate to a dynamic acquisition, re-distribution, enforcement, and tracking of media content rights using a distributed media rights transaction ledger.

BACKGROUND

Advancements in the field of digital media industry, digital media content rights management, and television and broadcasting sector have led to development of various technologies and broadcasting platforms that are revolutionizing the way consumer devices access and consume media content. Usually, broadcasting platforms refer to the types of networks that are used to deliver the media content to the consumers. Currently, all the broadcasting platforms, such as analog terrestrial broadcast, digital terrestrial broadcast, direct-to-home satellite broadcast, cable, Internet Protocol (IP), and over-the-top television (OTT), compete and strive to increase their appeal in order to gain wider audience.

The television viewing market is no longer exclusively concerned with whether media content services are viewed on a dedicated television or another device capable of playing media content. As a result of penetration of new technologies in the television and broadcasting sector, it is evident that the future success of television broadcasting will be dependent on the ability of a network provider to simplify access to the content that consumers demand.

Increased competition has led the broadcast providers, the media content owners, and the media content re-distributors to handle multiple channels, associated media content rights, and modes of delivery at the same time, which in turn have added unparalleled levels of complexity. This requires installation of large infrastructures and resources to maintain uninterrupted content delivery for existing channel and also meet the ever-increasing demand of new channels.

Currently, clearance and negotiations of media content rights are very time consuming and backed by readily inaccessible/unusable data. Further, multiple content libraries by various entities, require separate subscriptions and make it difficult for users to navigate to content of their choice freely without having individual subscription. From content consumer's perspective, there are multiple content libraries available from different service providers that are increasing in number day-by-day, thereby making it difficult for the content consumers to add and manage different subscriptions to consume the content of their choice. Furthermore, third-party measurement of viewership of a media content may be costly, myopic, and often not available for all platforms. There is no mechanism to precisely track media content rights and royalties for various entities. Further, isolated media content catalogs and third-party dependencies to estimate viewership for a media content, such as a TV show, to plan for future advertisement inventory needs and obligations, increase complexities. This in turn increases re-work and requires installation of large infrastructures and resources to maintain uninterrupted media content delivery for existing channels and limits the ability of the broadcaster or distributor to change content and/or provide customized content in real time or near-real time.

Thus, a new and advanced ecosystem may be desirable where all the stakeholders, such as the content owners, the content distributors and re-distributors, gateways, and the end consumers, can functionally interact with each other quickly and securely for acquisition, re-distribution, enforcement, and overall tracking of content rights to provide simplified and customized access to the content that consumers demand.

Further limitations and disadvantages of conventional and traditional approaches will become apparent to one of skill in the art, through comparison of such systems with some aspects of the present disclosure as set forth in the remainder of the present application with reference to the drawings.

SUMMARY

Systems and/or methods are provided for establishing a network of nodes and participants for dynamic management of media content rights, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION

DETAILED DESCRIPTION

Certain embodiments of the disclosure may be found in a method and system for establishing a network of nodes and participants for dynamic management of media content rights. Various embodiments of the disclosure provide a method and system that simplifies and secures the acquisition, re-distribution, enforcement, and tracking of media content rights using a distributed media rights transaction ledger in a cost-effective and seamless manner. Various embodiments of the disclosure provide a mechanism by which all the participants, such as the content owners, distributors, and the content consumers, may functionally interact with each other seamlessly and securely to enable simplified, unified, and customized access to the media content that content consumers demand by simplifying the overall flow of media content rights. The disclosed method and system further provide an ability for dynamic and on-the-fly negotiation of media content rights, contractual obligations, and preparation of custom catalogs to provide new and customized media asset offerings in cost-effective manner and enhanced viewer experience to reinvigorate the digital media and television content broadcasting industry.

In accordance with various embodiments of the disclosure, a system is provided for establishing a network of nodes and participants for dynamic management of media content rights. In an embodiment, the system may comprise a plurality of nodes configured to interact with each other in accordance with a defined protocol in a communication network. At least one node of the plurality of nodes, associated with a corresponding participant, interacts with one of remaining nodes of the plurality of nodes associated with a participant which owns media content and maintains control over enforcement of media content rights associated with the media content. The at least one node of the plurality of nodes may be configured to manage at least one media content rights transaction of a plurality of media content rights transactions with one or more remaining nodes of the plurality of nodes. The plurality of media content rights transactions may be managed by the plurality of nodes in accordance with the defined protocol in the communication network. The system may further comprise a plurality of instances of a distributed media rights transaction ledger associated with a respective node of the plurality of the nodes. Each instance of the distributed media rights transaction ledger may include the plurality of media content rights transactions categorized and defined based on the defined protocol.

Figure 1:
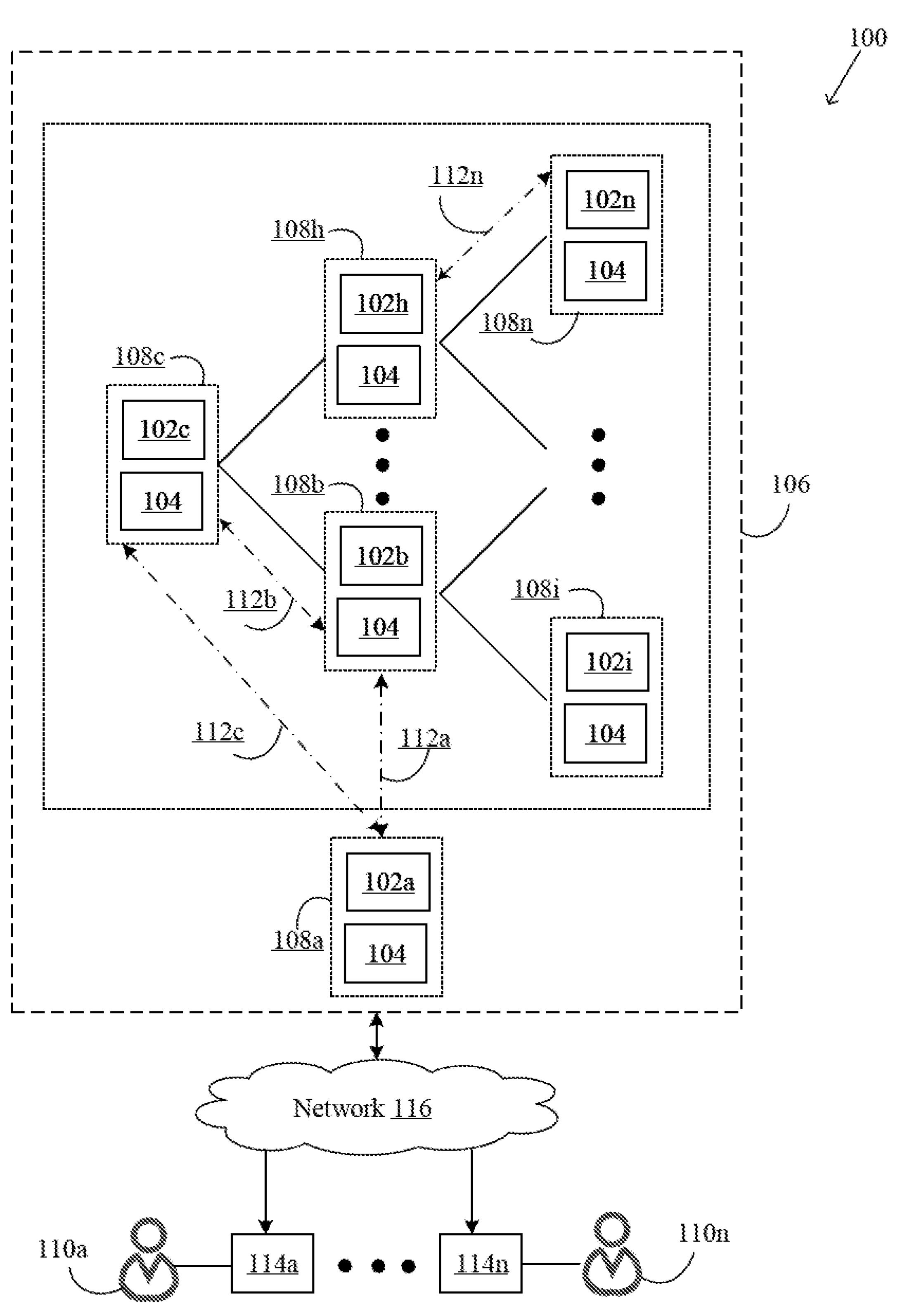
FIG. 1 is a block diagram that illustrates an exemplary system for establishing a network of nodes and participants for dynamic management of media content rights, in accordance with an exemplary embodiment of the disclosure.

FIG. 1 is a block diagram that illustrates an exemplary system for establishing a network of nodes and participants for dynamic management of media content rights, in accordance with an exemplary embodiment of the disclosure. Referring to FIG. 1, there is shown a network of nodes and participants, hereinafter "ecosystem 100", for dynamic management of media content rights, in accordance with an exemplary embodiment of the disclosure. The ecosystem 100 may comprise a plurality of nodes 102*a*, . . . , 102*n* that are communicatively coupled to each other. There is shown a distributed media rights transaction ledger 104 that remain distributed and synchronized with the plurality of nodes 102*a*, . . . , 102*n*, in a communication network 106. There is further shown a plurality of participants 108*a*, . . . , 108*n* and 110*a*, . . . , 110*n*, that may be associated with corresponding nodes from the plurality of nodes 102*a*, . . . , 102*n*. One or more nodes from the plurality of nodes 102*a*, . . . , 102*n* may be configured to manage a plurality of media content rights transactions 112*a*, . . . , 112*n* with one or more remaining nodes of the plurality of nodes 102*a*, . . . , 102*n*. The plurality of participants 108*a*, . . . , 108*n* and 110*a*, . . . , 110*n* include a plurality of entities 108*a*, . . . , 108*n* and a plurality of content consumers 110*a*, . . . , 110*n*. There is further shown a plurality of consumer devices 114*a*, . . . , 114*n* associated with respective content consumers of the plurality of content consumers 110*a*, . . . , 110*n*. The distributed communication network 106 may be communicatively coupled to the plurality of content consumers 110*a*, . . . , 110*n* via a network 116.

The ecosystem 100 may provide an online platform for creation of a digital marketplace where new media markets, such as a content trading markets, may emerge. Such a digital marketplace for media content rights may then be realized based on a defined protocol or a method which defines a standard for the plurality of nodes 102*a*, . . . , 102*n* to communicatively couple and interact with each other. The defined protocol may be configured to establish a network of the plurality of nodes 102*a*, . . . , 102*n*, and the plurality of participants 108*a*, . . . , 108*n* and 110*a*, . . . , 110*n* upon which media content rights may be acquired, redistributed, constraints enforced, transferred or consumed. Among the plurality of participants 108*a*, . . . , 108*n* and 110*a*, . . . , 110*n* of the ecosystem 100, a simplified, secured, real-time, and fail-safe tracking of the media content rights is ensured. In accordance with an embodiment, a media content right associated with a media content may be an electronic implementation of a legal contract designed to allow only authorized redistribution of the digital media content and restrict the ways the media content is consumed.

The plurality of nodes 102*a*, . . . , 102*n* may correspond to a server or a service that may be configured to execute an implementation of the defined protocol for joining the communication network 106. In accordance with some embodiments, a node of the plurality of nodes 102*a*, . . . , 102*n* may be a software application that includes a set of instructions for defining rules for the programmatic implementation of the defined protocol. In accordance with other embodiments, a node of the plurality of nodes 102*a*, . . . , 102*n* may be a hardware device in which the software application is executed. The hardware device may be owned by an entity, for example, a content owner or a content distributor. The plurality of nodes 102*a*, . . . , 102*n* may be further configured to maintain a copy of the distributed media rights transaction ledger 104 and may create, distribute, execute, and validate media content rights transactions on/from the communication network 106. In accordance with an embodiment, each node of the plurality of nodes 102*a*, . . . , 102*n* may be further configured to maintain a corresponding instance of the distributed media rights transaction ledger 104 and communicate the corresponding instance of the distributed media rights transaction ledger 104 to the one or more remaining nodes upon request.

At least one node of the plurality of nodes 102*a*, . . . , 102*n*, such as a second node 102*b*, a third node 102*c*, or a verifier node 102*n*, may be further configured to verify the one or more media content rights transactions of the plurality of media content rights transactions 112*a*, . . . , 112*n* communicated by the one or more remaining nodes of the plurality of nodes 102*a*, . . . , 102*n*. In accordance with an embodiment, the verification may be based on verifying the identity and signature of the sender entity, such as the first entity 108*a* associated with the first node 102*a*.

In accordance with an embodiment, the at least one node of the plurality of nodes 102*a*, . . . , 102*n*, such as the second node 102*b*, the third node 102*c*, or the verifier node 102*n*, may be further configured to reject a set of invalid media content rights transactions from the one or more media content rights transactions. In accordance with an embodiment, the rejection may be based on the un-verified identity and signature of the sender entity, such as the first entity

108*a* associated with the first node 102*a* and create new media content rights transactions on behalf of at least one of a content consumer, content distributor, or content owner. The new media content rights transactions may be communicated to the one or more remaining nodes.

In accordance with an embodiment, negotiations for media content rights for media content, for example a media asset, between two or more entities, such as a content distributor or a content owner, include media content rights transactions. Each entity dictates corresponding terms of agreement for the media content. The media content rights transactions may occur in a sequence, forming a sequence of events. In some embodiments, the negotiations for the media content rights may occur in the communication network 106, where each media content rights transaction may be broadcasted to the entire communication network 106 (i.e., to all the nodes of the plurality of nodes 102*a*, . . . , 102*n* in the communication network 106). In other embodiments, the negotiations for the media content rights may be done mutually, where two or more nodes respective to each entity may communicate by issuing transactions directly to one another instead of broadcasting media content rights transactions to the entire communication network 106. In this regard, one or more media content rights transactions may be private media content rights transactions between two entities for which private channels may be created via nodes of the plurality of nodes 102*a*, . . . , 102*n* to communicate the private media content rights transactions between the two entities. This type of media content rights transaction may form a sister collection of media content rights transactions between the two entities. This may prevent excess traffic (distribution and validation of transactions) on the communication network 106 (of other nodes outside of the negotiation) and frees up other nodes to handle core traffic. However, every set of such mutual negotiations ends with one media content rights transaction on the distributed media rights transaction ledger 104 that dictates a contract between two or more entities over media content rights to agreed media content, such as one or more media assets, which may include some or all of the data referenced in the private media content rights transactions in a clear or encrypted form.

In accordance with an embodiment, at least one node of the plurality of nodes 102*a*, . . . , 102*n* may be further configured to determine (or discover) one or more new nodes which joined the communication network 106 within a defined time period, and communicate information associated with the plurality of nodes 102*a*, . . . , 102*n* to the one or more new nodes. Thus, each node may be further configured to communicate media content rights transactions to other nodes, regardless of whether the media content rights transactions originate with the node or were communicated to it by other nodes. This way, any given media content rights transaction may be disseminated to all nodes on the communication network 106. The at least one node of the plurality of nodes 102*a*, . . . , 102*n* may be further configured to enforce an adherence of the plurality of nodes 102*a*, . . . , 102*n* to the protocol by refusing or accepting to communicate with the plurality of nodes 102*a*, . . . , 102*n*.

In accordance with an embodiment, a node of the plurality of nodes 102*a*, . . . , 102*n* may be configured to act as an electronic gateway or a proxy for a consumer device associated with a content consumer to connect with at least one node of the plurality of nodes 102*a*, . . . , 102*n*. In this regard, the node is accessible to consumer devices via an application programming interface (API) which allows the content consumers to interact with the communication network 106. The entity that belongs to a first node, such as a gateway, and acting on behalf of the content consumer, may acquire media content rights and gather metadata surrounding available media content. The purpose of a node proxying a content consumer, such as one of the plurality of content consumers 110*a*, . . . , 110*n*, to the communication network 106 is to allow rapid scaling of the number of content consumers without the need to scale the count of nodes.

Such node of the plurality of nodes 102*a*, . . . , 102*n* may be further configured to determine an identity of the content consumer from credentials of the content consumer. In accordance with an embodiment, the identity may be derived from a globally unique cryptographic identifier associated with the content consumer. The node may be further configured to determine that the identity of the content consumer exists in an alternate data store that is created based on at least a corresponding instance of the distributed media rights transaction ledger 104. The alternate data store may include a set of transactions of the plurality of media content rights transactions 112*a*, . . . , 112*n* that correspond to records of a plurality of content consumers that joins the communication network as new content consumers. The node may be configured to validate the content consumer based on the existence of the identity of the content consumer in the alternate data store.

In accordance with an embodiment, the at least one node may be further configured to enforce a plurality of constraints associated with the one or more media content rights defined in at least one transaction of the plurality of media content rights transactions 112*a*, . . . , 112*n* for a participant to acquire, distribute, or consume content associated with the one or more media content rights. In accordance with an embodiment, each node may represent at least one participant on the communication network 106 based on signed transactions originated from the node with a cryptographic signature of corresponding participant.

In accordance with an embodiment, a node of the plurality of nodes 102*a*, . . . , 102*n* may be responsible and configured to communicate corresponding instance of the distributed media rights transaction ledger 104, to other requesting nodes in the communication network 106. Accordingly, a new node may be configured to share the same distributed media rights transaction ledger history with any/all other nodes as well, which allows auditing an instance of the distributed media rights transaction ledger 104 associated with corresponding node. In other words, each node may append corresponding media content rights transactions, as well as media content rights transactions from other nodes in its own instance of the distributed media rights transaction ledger 104.

The distributed media rights transaction ledger 104 may correspond to a consensus of replicated, shared, and synchronized digital data, for example the plurality of media content rights transactions 112*a*, . . . , 112*n*, geographically spread across multiple sites, countries, or institutions. The distributed media rights transaction ledger 104 has no central administrator or centralized data storage. Data integrity in the distributed media rights transaction ledger 104 may be secured by consensus across the sites in addition to cryptographic techniques.

In accordance with an embodiment, the distributed media rights transaction ledger 104 may include records of historical interactions in a time sequence related to flow or movement of media content rights from a content owner to a content distributor, or from a content distributor to another content distributor, or from a content owner or a content distributor to a content consumer in any arbitrary media content right transaction. In some embodiments, in addition to media content rights, the distributed media rights transaction ledger 104 may include records of historical interactions in a time sequence of media consumption by content consumer and related data/analytics, content catalog information, and the like.

The communication network 106 may correspond to a collection of nodes, such as the plurality of nodes 102*a*, . . . , 102*n*, that interact with one another, perform broadcast media content rights transactions with respect one another, and maintain a copy of the distributed media rights transaction ledger 104 to act as a common store of data. In accordance with various embodiment, the communication network 106 may be a peer-to peer network, a protocol network, a distributed communication network and/or the like. In accordance with other embodiments, the communication network 106 may comprise one or more of a cable television networks, the Internet, a satellite communication network, a wide area network (WAN), a medium area network (MAN), and a local area network (LAN). Although a communication network 106 is shown in FIG. 1, the disclosure is not limited in this regard; accordingly, other exemplary modes may comprise uni-directional or bi-directional distribution, such as packet-radio or satellite communication.

The plurality of participants 108*a*, . . . , 108*n* and 110*a*, . . . , 110*n*, may correspond to a group, a collective, an individual, or a company that may operate the plurality of nodes 102*a*, . . . 102*n* on the communication network 106. A participant of the plurality of participants 108*a*, . . . 108*n* and 110*a*, . . . , 110*n*, may act as an entity of a plurality of entities 108*a*, . . . , 108*n* or a content consumer of a plurality of content consumers 110*a*, . . . , 110*n*. Each participant of the plurality of participants 108*a*, . . . , 108*n* and 110*a*, . . . , 110*n* may interacts within the communication network 106 by operating at least one node that adheres to the defined protocol within the communication network 106.

Each entity of the plurality of entities 108*a*, . . . , 108*n* may be configured to interact with the communication network 106 by operating at least one node on the communication network 106 which adheres to the defined protocol. An entity associated with a node of the plurality of nodes 102*a*, . . . , 102*n* may present metadata of a plurality of content libraries as a unified library. Another entity of the plurality of entities 108*a*, . . . , 108*n* may represent a content owner, a content distributor, or both. From the content owner, one or more media content rights associated with media content may be originated. The content owners may be responsible for issuing licenses for consumption of the media content by the content consumers. All media content, such as the media assets, may have only one content owner in perpetuity. Media content rights to the media content, such as the media assets, may be acquired, and re-distributed in accordance with the permission of the content owner.

A content distributor of the plurality of entities 108*a*, . . . , 108*n* may acquire media content rights from another content owner or another content distributor and redistribute the acquired media content rights to other content distributors and gateway nodes. In accordance with an embodiment, the content owner may own a given collection of media content rights to be sold and/or distributed to content distributors and/or content consumers. When a content consumer is interacting with the communication network 106 through a node, which belongs to a given entity in the communication network 106, the content consumer may be considered to be owned by the given entity. Accordingly, the communication network 106 may be secured by ensuring that: a) content consumer transactions adhere to the protocol as enforced by the proxying/gateway node; b) the entity assumes responsibility over transactions requested by the content consumer; and c) another entity may request to validate the identity of a given user from a prior content owner using the distributed media rights transaction ledger 104. An example of validating an identity of a given content consumer is described in FIG. 4.

On the other hand, the content consumer of the plurality of content consumers 110*a*, . . . , 110*n* may be a user or an individual who may acquire media content rights via a gateway on the communication network 106. Accordingly, the content consumer may execute media content rights to acquire media content licenses to consume the media content. The content consumer may not have the ability to redistribute the acquired media content right. In accordance with an embodiment, the content consumer may require an entity (one of the content owner or the content distributor) that belongs to a node, such as a proxy or a gateway node, to interact with the ecosystem 100 on behalf of the content consumer. Therefore, the content consumer may not be configured to operate any node of the plurality of nodes 102*a*, . . . , 102*n*. The content consumer of the plurality of content consumers 110*a*, . . . , 110*n* may be associated with a corresponding consumer device of the plurality of consumer devices 114*a*, . . . , 114*n*. A given content consumer may be unique across the entire communication network 106, regardless of which entities the content consumer interacts with or belongs to, based, for example, on a subscription or membership.

In accordance with an embodiment, an entity, as a content owner and/or a content distributor, may serve as a gateway for the plurality of content consumers 110*a*, . . . , 110*n* and act on the behalf of the plurality of content consumers 110*a*, . . . , 110*n*. Further, the entity may acquire the media content rights to distribute the media content that it does not own to other content distributors and/or content consumers. In such a case, the entity may act on the behalf of the plurality of content consumers 110*a*, . . . , 110*n*. In this regard, when a content consumer is proxied through an entity to the communication network 106, the entity may become an owner of the content consumer.

The plurality of media content rights transactions 112*a*, . . . , 112*n* make up the core unit (or building block) of data that may be recorded into the distributed media rights transaction ledger 104 of the communication network 106. Each media content rights transaction of the plurality of media content rights transactions 112*a*, . . . , 112*n* may act as a container for exchange of data across nodes among the plurality of nodes 102*a*, . . . , 102*n*. The structure of each media content rights transaction and corresponding data payload may be specified by the defined protocol for a given context, such that the plurality of nodes 102*a*, . . . , 102*n* in the communication network 106 may accept, reject, validate, and parse the plurality of media content rights transactions 112*a*, . . . , 112*n* in a deterministic and non-ambiguous manner.

Each media content rights transaction of the plurality of media content rights transactions 112*a*, . . . , 112*n* may be created by a node of the plurality of nodes 102*a*, . . . , 102*n*, and recorded into corresponding instance of the distributed media rights transaction ledger 104. Further, media content rights transaction of the plurality of media content rights transactions 112*a*, . . . , 112*n* may be communicated to other nodes to be rejected and dismissed or validated and recorded into corresponding instances of the distributed media rights transaction ledger 104 maintained at respective nodes of the plurality of nodes 102$a$, . . . , 102$n$. The data traffic created by the plurality of media content rights transactions 112$a$, . . . , 112$n$ between the nodes of the plurality of nodes 102$a$, . . . , 102$n$ is what defines the ecosystem 100 or the marketplace of media content rights. Each of the plurality of media content rights transactions 112$a$, . . . , 112$n$ may be categorized and specified by the defined protocol. Each media content right transaction may include the category of: a) an announcement of a newly created entity; b) an announcement of a newly created content consumer; c) an announcement of newly available media content, such as a media asset; d) an acquisition of media content rights to media content (as a result of negotiations); and e) consumption of the media content by a content consumer.

In accordance with various embodiments, each of the plurality of media content rights transactions 112$a$, . . . , 112$n$ may be configured to define the acquisition and execution of media content rights. Each of the plurality of media content rights transactions 112$a$, . . . , 112$n$ may be stored in the distributed media rights transaction ledger 104 to serve as a history of interactions between various entities. Each of the plurality of media content rights transactions 112$a$, . . . 112$n$ must be originated from a node of the plurality of nodes 102$a$, . . . , 102$n$, and must be distributed to all nodes within the communication network 106 for validation and synchronization. Each of the plurality of media content rights transactions 112$a$, . . . , 112$n$ may comprise at least one of an originating node's entity's cryptographic signature, a recipient entity's cryptographic identity, and identity of one or more media content rights for a given media content, negotiated terms of one or more media content rights, an identity of a content consumer, and disparate data associated with consumption of media content by a content consumer. Each of the plurality of media content rights transactions 112$a$, . . . , 112$n$ may further comprise an encrypted summary of a set of media content rights transactions, one or more cryptographic hashes of historic media content rights transactions from the distributed media rights transaction ledger 104 for linking one media content rights transaction to another, and a cryptographic hash of all data comprising the media content rights transaction. Each of the plurality of media content rights transactions 112$a$, . . . , 112$n$ may further comprise a descriptor for the intent of the media content rights transaction, which may further include at least granted media content rights after a negotiation, transferal of a media content right, and intent to begin a negotiation with another entity, grant of a media content right, consumption of media content by a content consumer, and registration of the plurality of participants 108$a$, . . . , 108$n$, and 110$a$, . . . 110$n$.

In accordance with an embodiment, in case a media content rights transaction is found to be invalid by most nodes in the communication network 106, the media content rights transaction may be discarded and not appended to the distributed media rights transaction ledger 104 across all nodes of the plurality of nodes 102$a$, . . . , 102$n$. There may be an exception, where such invalid media content right transactions may be added to the distributed media rights transaction ledger 104, but remain invalid, to serve as a history of the origin of invalid media content rights transactions. Such a history may serve as a mechanism to audit potential attacks on the communication network 106 during auditing.

The network 116 may be any kind of network, or a combination of various networks, and it is shown illustrating the communication that may occur between the plurality of consumer devices 114$a$, . . . , 114$n$ and the distributed communication network 106. For example, the communication network 106 may comprise one or more of a cable television networks, the Internet, a satellite communication network, a wide area network (WAN), a medium area network (MAN), and a local area network (LAN). Although the network 116 is shown, the disclosure is not limited in this regard, accordingly, other exemplary modes may comprise uni-directional or bi-directional distribution, such as packet-radio, satellite.

In operation, a node, such as the first node 102$a$, of the plurality of nodes 102$a$, . . . 102$n$ may be configured to receive login credentials, such as a username and a password, from the plurality of content consumer 110$a$, . . . , 110$n$, via respective consumer devices, such as the plurality of consumer devices 114$a$, . . . , 114$n$. The first node 102$a$ may be configured to derive a unique cryptographic identifier, such as a unique string of alphanumeric characters of defined length, from the login credentials of each of the plurality of content consumer 110$a$, . . . , 110$n$. The unique cryptographic identifier may be derived based on, for example a hashing algorithm, defined in the protocol defined in the communication network 106, and may be stored in the alternate data store 214$a$ owned by the first node 102$a$.

In accordance with an embodiment, at a later time, when the first content consumer 110$a$ requests for a desired media content for consumption, by providing corresponding login credentials, the first node 102$a$, for example a streaming media and VOD service provider, may be configured to determine whether the unique cryptographic identifier of the first content consumer 110$a$ is found in the alternate data store 214$a$ associated with the first node 102$a$. If not found, a validator system, for example another entity representing a direct broadcast satellite service provider, may be checked based on the distributed media rights transaction ledger 104. In accordance with an embodiment, a validator may be found for the unique cryptographic identifier of the first content consumer 110$a$ using the distributed media rights transaction ledger 104. The validator may be found in case the validator system may have previously interacted with the first content consumer 110$a$, and corresponding content media rights transaction is stored in the distributed media rights transaction ledger 104. In an embodiment, the validator is not found for the unique cryptographic identifier of the first content consumer 110$a$ using the distributed media rights transaction ledger 104, the first content consumer 110$a$ may be invalidated.

In accordance with another embodiment, the first node 102$a$ may be configured to validate the first content consumer 110$a$ based on the existence of the unique cryptographic identifier of the first content consumer 110$a$ in the alternate data store 214$a$ of the first node 102$a$. Additionally, the presence of the validator may validate the first content consumer 110$a$. Accordingly, the first node 102$a$ may be configured to receive media content rights request, corresponding to media content selection, from the first content consumer 110$a$, via the first consumer device 114$a$.

In accordance with an embodiment, the unified library/custom catalog 214$b$ owned by the first node 102$a$ may identify, prepare and present media content on-the-fly specifically for the first content consumer 110$a$, based on consumer behavior and consumption pattern of the first content consumer 110$a$, for playback. In accordance with an embodiment, the first content consumer 110$a$ may provide a selection of a new media content which is not presented by the unified library/custom catalog 214$b$.

In accordance with an embodiment, the first node 102$a$ may determine whether the media content rights (associated with selected media content) are available in the unified library/custom catalog 214*b* owned by the first node 102*a*. In this regard, it may be determined whether the first content consumer 110*a* or the first entity 108*a* associated with the first node 102*a* have been granted the media content rights associated with the selected media content in the unified library/custom catalog 214*b* owned by the first node 102*a*. In case the media content rights associated with the selected media content are available at the first node 102*a*, the media content may be selected for consumption/execution of the rights from the unified library/custom catalog 214*b* and provided to the first content consumer 110*a* by the first node 102*a*.

In case the first content consumer 110*a* or the first entity 108*a* associated with the first node 102*a* has not been granted the media content rights associated with the selected media content in the unified library/custom catalog 214*b*, the first node 102*a* may determine whether the media content rights (associated with selected media content) are available for acquisition with the second entity associated with the second node 102*b* or the third entity associated with the third node 102*c*.

In accordance with an embodiment, the first node 102*a* may be configured to dynamically acquire the media content rights from the second entity associated with a second node 102*b* (that may redistribute the media content rights to the first content consumer 110*a*) by negotiating with the second entity associated with the second node 102*b* that has the media content rights to redistribute. In accordance with another embodiment, the first node 102*a* may be configured to acquire the media content rights from the third entity associated with the third node 102*c* (that may own the media content and may directly provide the media content rights) by negotiating with the third entity associated with the third node 102*c* that owns the media content and associated media content rights.

Accordingly, the first entity 108*a* associated with the first node 102*a* may be configured to negotiate with the second entity associated with the second node 102*b* or the third entity associated with the third node 102*c*. The negotiation may be performed for acquisition of the media content rights and based on a plurality of interactions between nodes from plurality of nodes 102*a*, . . . , 102*n*, in accordance with defined protocol in the communication network 106. The plurality of interactions between nodes from plurality of nodes 102*a*, . . . , 102*n* may result in the plurality of media content rights transactions 112*a*, . . . , 112*n* that may be stored in corresponding instances of the distributed media rights transaction ledger 104 maintained by each node of the plurality of nodes 102*a*, . . . , 102*n* within the communication network 106 for validation and synchronization.

In accordance with an embodiment, each node may cryptographically hash transaction data of each transaction. This hash may then be digitally signed by the media content rights transaction creator with a private key of a private key-public key pair. The public key may then be shared with other nodes whereas the private key is kept as a secret. This allows a node to verify the creator (or the initiator) of the media content rights transaction, and that the media content rights transaction data is not altered according to the hash digitally signed by the creator. Every single media content rights transaction is verified by checking the distributed media rights transaction ledger 104 distributed at the plurality of nodes 102*a*, . . . , 102*n*. Recent validated media content rights transactions may be grouped and cryptographically identified using, for example, but not limited to a hashing algorithm, defined by the protocol. Each group may have a unique cryptographic identifier which is derived from a previous group's final cryptographic identifier, transaction data's cryptographic identifier, and a defined mathematical value. The rules of the protocol may be defined in the genesis group, i.e. the first group. Given the different types of the media content rights transactions, nodes may be configured to derive certain data representing a marketplace, such as the ecosystem 100. The data that is derivable by each node of the plurality of nodes 102*a*, . . . , 102*n* may include a global catalog of available content items, a per-entity catalog or an entity level catalogs of available content (based on ownership/distribution rights), and a global user consumption of content items. Such data may create the possibility of inferring the value of media content items based on its demand (user consumption) and its supply (availability versus number of content distributors). An entity may then choose to invoke a negotiation with another entity, or entities, to acquire or distribute the media content rights to a media content item. Because the defined protocol dictates the method in which two or more entities may negotiate, negotiations may then occur dynamically and without premeditated action on behalf of any participating entities in the communication network 106.

Once the negotiation is successful, the first node 102*a* may be configured to provide the media content rights acquired from the second node 102*b* or the third node 102*c* to the first consumer device 114*a*. In accordance with an embodiment, the media player of the first consumer device 114*a* may be provided a link of the media content from the media content master repository 222 of the third entity associated with the third node 102*c* to start viewing the media content based on the dynamically acquired rights.

Figure 2:
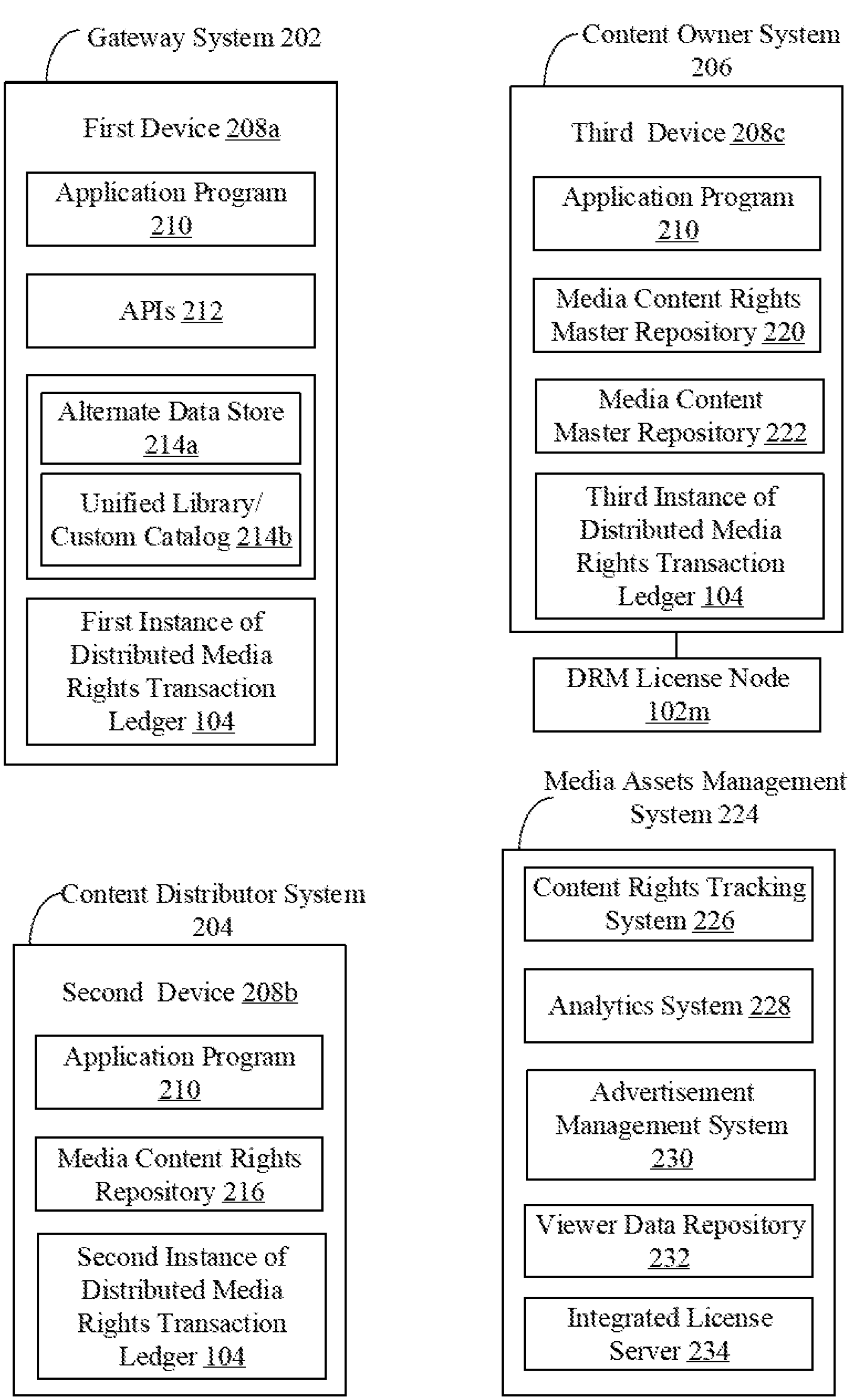
FIG. 2 depicts exemplary block diagrams for various systems of a distributed communication network 106 in the ecosystem 100 of FIG. 1, in accordance with an exemplary embodiment of the disclosure.

FIG. 2 depicts exemplary block diagrams for various systems of a distributed communication network 106 in the ecosystem 100 of FIG. 1, in accordance with an exemplary embodiment of the disclosure. With reference to FIG. 2, there are shown a gateway system 202, a content distributor system 204, a content owner system 206, and a media assets management system 224. The gateway system 202 may correspond to the first entity 108*a* associated with the first node 102*a* of the plurality of nodes 102*a* . . . , 102*n* described in FIG. 1. Similarly, the content distributor system 204 may correspond to the second entity associated with the second node 102*b* of the plurality of nodes 102*a* . . . , 102*n* described in FIG. 1. Similarly, the content owner system 206 may correspond to the third entity associated with the third node 102*c* of the plurality of nodes 102*a* . . . , 102*n* described in FIG. 1. The media assets management system 224 may correspond to an arbitrary node of the plurality of nodes 102*a* . . . , 102*n*.

The gateway system 202 may include a first device 208*a*, an application program 210, APIs 212, an alternate data store 214*a*, a unified library/custom catalog 214*b*, and a first instance of distributed media rights transaction ledger 104. The content distributor system 204 may include a second device 208*b*, the application program 210, a media content rights repository 216, a media content repository 218, and a second instance of distributed media rights transaction ledger 104. The content owner system 206 may a third device 208*c*, the application program 210, a media content rights master repository 220, a media content master repository 222, and a third instance of distributed media rights transaction ledger 104. The content owner system 206 is shown to be associated with a digital rights management (DRM) license node 102*m*.

The media assets management system 224 may include a content rights tracking system 226, an analytics system 228, an advertisement management system 230, a viewer data repository 232, and an integrated license server 234. In some embodiments of the disclosure, the content rights tracking system 226, the analytics system 228, the advertisement management system 230, the viewer data repository 232, and the integrated license server 234 may be integrated to form a single integrated system. In other embodiments of the disclosure, the various systems may be distinct. Other separation and/or combination of the various entities of the exemplary media assets management system 224 illustrated in FIG. 2 may be done without departing from the scope of the disclosure.

The gateway system 202 may comprise suitable logic, circuitry, and interfaces that may be configured to execute code that is accessible to the plurality of consumer devices 114*a*, . . . , 114*n* via the APIs 212. The APIs 212 allow content consumers 110*a*, . . . , 110*n* to interact with the plurality of nodes 102*a*, . . . , 102*n* in the communication network 106, with an entity representing, for example a streaming media and VOD service provider or a direct broadcast satellite service provider, that owns the gateway system 202 acting on behalf of the plurality of consumer devices 114*a*, . . . , 114*n*. The interaction may result in acquisition of media content rights for the plurality of consumer devices 114*a*, . . . , 114*n* to consume media content and gather metadata associated with available media content.

The first device 208*a* may be owned by the gateway system 202 (or the first node 102*a*) and configured to store the application program 210, the APIs 212, and the first instance of distributed media rights transaction ledger 104. The first device 208*a* may be further configured to store or reference the alternate data store 214*a* and the unified library/custom catalog 214*b*. The alternate data store 214*a* may include a plurality of unique identities which may be represented as a cryptographic value corresponding to each valid content consumer. The alternate data store 214*a* may be created using at least the distributed media rights transaction ledger 104, in which each new content consumer joining the communication network 106 is recorded as a media content rights transaction. A requesting content consumer is validated in case the identity cryptographic value of the requesting content consumer is found in the alternate data store 214*a* based on a match of the identity hash value with one of the plurality of unique identifiers stored in the alternate data store 214*a* or the first instance of distributed media rights transaction ledger 104.

The gateway system 202 may be configured to present metadata of multiple content libraries that may be owned by different entities, for example, different content owners, distributors, re-distributors, VOD service providers, and the like, as the unified library/custom catalog 214*b* for the content consumers 110*a*, . . . , 110*n*, to navigate. In this regard, the unified library/custom catalog 214*b* may correspond to a collection of media content belonging to one or more entities having media content rights available for acquisition, distribution, and/or consumption. Further, the unified library/custom catalog 214*b* may be identified, prepared, and presented on-the-fly specifically for a content consumer, such as the first content consumer 110*a*, based on consumer behavior and consumption pattern of the first content consumer 110*a*, for playback.

Currently due to isolated content libraries and different subscriber base, a narrow view of content consumers related to media consumption pattern is available. The gateway system 202 may solve this problem by presenting metadata of multiple content libraries as the unified library/custom catalog 214*b*. Based on the communication network 106, an industry-wide network and ecosystem 100 is created, where an industry-wide single sign-on for the content consumers 110*a*, . . . , 110*n*, may be provided by the gateway system 202 to navigate through an industry-wide shared content library, where media content rights to a media content may be dynamically acquired, distributed, and enforced, by way of media content rights transactions. Thus, previously untapped markets may be identified, and un-monetized media content may be monetized by dynamic provisioning of media content rights to an accepting entity. In accordance with an embodiment, the gateway system 202 may also include the first instance of the distributed media rights transaction ledger 104, and thus may also function as a node. This node or another node associated with the same entity (e.g., a service provider that controls or owns the gateway system 202) may be required to update corresponding distributed media rights transaction ledger 104, in accordance with the media content rights transactions proxied for each content consumer (i.e., playback of requested media contents, ad plays, content requests, and the like.) Such update may be broadcasted to other connected nodes of the plurality of nodes 102*a*, . . . , 102*n* for synchronization of the recently updated media content rights transaction in the distributed media rights transaction ledger 104 across the plurality of nodes 102*a*, . . . , 102*n*.

The content distributor system 204 may comprise suitable logic, circuitry, and interfaces that may be configured to execute code to acquire media content rights to distribute the media content that it does not own to other content distributors and/or content consumers. In accordance with an embodiment, the content distributor system 204 may act on content consumer's behalf. In accordance with an embodiment, the content distributor system 204 may also act as a content owner, in tandem. As illustrated in FIG. 2, the content distributor system 204 may own the second device 208*b* that may be configured to store the application program 210, the second instance of the distributed media rights transaction ledger 104, the media content rights repository 216, and the media content repository 218.

The content owner system 206 may comprise suitable logic, circuitry, and interfaces that may be configured to execute code to own a collection of media content rights to be sold/distributed to content distributors, such as the second node 102*b*, and/or content consumers, such as the plurality of content consumers 110*a*, . . . , 110*n*. Such content owners may be further configured to issue licenses to such content consumers for consumption of the media content. As illustrated in FIG. 2, the content owner system 206 may own the third device 208*c* that may be configured to store the application program 210, the third instance of the distributed media rights transaction ledger 104, the media content rights master repository 220, and the media content master repository 222. The media content master repository 222 may be a database of media content or media assets that are owned by the content owner system 206. The media assets may include uncompressed content, live content segments of one or more live feeds of channels, and/or VOD content. Generally, the term "content," "media," "media content," "media assets" and similar words are used interchangeably to refer to any type of media—audio, videos, datacasts, music, text, images, graphics, articles, photos, photo galleries, video galleries, infographics, maps, polls, guest biographies, tweets or other social media, blog posts, and/or the like. The media content rights master repository 220 may be a database of media content rights associated with the media content, available for negotiation. A media content right may be an electronic implementation of a legal contract designed to allow only authorized redistribution of digital media content and restrict the ways the media content is consumed.

The DRM license node **102*m* may correspond to a DRM license server for media content (that belongs to the content owner system 206) stored in the media content master repository 222. Metadata necessary to acquire a license from the DRM license node 102*m* associated with the content owner system 206, may include, but is not limited to, a distributed media rights transaction ledger identifier representing a media content, a distributed media rights transaction ledger identifier of an entity (that owns for example the gateway system 202**) facilitating the consumption of playback, and a distributed media rights transaction ledger identifier representing a content consumer. Such identifiers may be encrypted and hashed by the entity facilitating the consumption of playback, creating a cryptographic signature which may be used to validate the origin of the request.

The media assets management system 224 may comprise suitable logic, circuitry, and interfaces that may be configured to execute code for being owned or managed by an entity and may operate at least one node of the plurality of nodes **102*a*, . . . , 102*n*. In some embodiments, the media assets management system 224 may be jointly owned or managed by a group of entities in one country or multiple countries, where each entity operates at least one node of the plurality of nodes 102*a*, . . . , 102*n*. In some embodiments, the media assets management system 224 may be a public and open system, services of which may be partially or completely available to all the nodes of the plurality of nodes 102*a*, . . . , 102*n* in the communication network 106**.

The content rights tracking system 226 may comprise suitable logic, circuitry, and interfaces that may be configured to execute code for tracking the media content rights or the flow of the media content rights of one or more media assets among various participants of the communication network 106 using the distributed media rights transaction ledger 104 maintained at each node. The content rights tracking system 226 increases operational efficiencies in the digital media and television content processing and digital rights management by allowing on-the-fly tracking of the media content rights or the flow of the media content rights of one or more media assets among various participants of the communication network 106 using the distributed media rights transaction ledger 104.

The analytics system 228 may comprise suitable logic, circuitry, and interfaces that may be configured to execute code for identifying (on-the-fly) a custom catalog specifically for a content consumer, such as the first content consumer **110*a*. The analytics system 228 may be further configured to prepare the custom catalog, and make available to the first content consumer 110*a*, via the gateway system 202. In some embodiments, the analytics system 228 may be configured to communicate the identified custom catalog to a particular node of an entity or a set of nodes of different entities subscribed to services of the analytics system 228. Thereafter, a scheduler system (not shown) of at least one node may be configured to prepare the custom catalog and make available to the content consumer 110*a*. Similar to the first content consumer 110*a*, based on behavior and consumption pattern of the plurality of content consumers 110*a*, . . . , 110*n*, a custom catalog comprising selected media content, may be identified, prepared, and presented to each of the plurality of content consumers 110*a*, . . . , 110*n* on respective plurality of consumer devices 114*a*, . . . , 114*n*** for media consumption.

The advertisement management system 230 may comprise suitable logic, circuitry, and interfaces that may be configured to execute code for dynamic insertion of pre-encoded VOD assets, or advertisement media, or other promotional media based on real-time data of media consumption of a particular media asset via the gateways system 202. The real-time data of media consumption may be received when a transaction related to the media consumption of media content is detected for a content consumer. In some embodiments, the advertisement media item (i.e., an ad) may be dynamically inserted at a specified position in the media asset associated with a detected content placement opportunity (CPO). The insertion may be done based on presence of an inbound trigger, such as society of cable telecommunication engineers (SCTE)-104-based trigger, at the specified position associated with the detected CPO. The manipulation of the catalogs or programming schedules may be driven by real time or near-real time change in user consumption behavior (that governs demand for particular type of content).

The viewer data repository 232 may comprise suitable logic, circuitry, and interfaces that may be configured to execute code for storing an industry-wide user behavioral data for the digital media and television content industry. The viewer data repository 232 may include individual consumer-based information and aggregate audience-based information. The individual consumer-based information may include parameters, such as favorite media assets, most preferred genre of media assets, most watched TV shows, and other content consumer-specific media preferences. The audience-based parameters may include calculated values derived by processing of media consumption data of a group of content consumers segregated by age, region, and the like. The group of content consumers may be associated with the plurality of consumer devices **114*a*, . . . , 114*n*. By use of the viewer data repository 232**, content development by an entity, such as content owners, may target a known market with precision. The behavioral data of the content consumers may be shared among the entities, such as the content owners and the content distributors, without involvement of any third-party that currently measures viewership data and sells such data to content owners and distributors at a premium/high cost.

The integrated license server 234 may correspond to an integrated DRM server managed or shared by multiple entities. In some embodiments, content rights of certain media content may be dynamically acquired from the plurality of different content owners using a single integrated license server, such as the integrated license server 234. In some embodiments, each entity, such as a content owner or a content distributor, may have their own DRM server to provide media content rights. Further in some embodiments, media content rights may be dynamically and automatically generated and provided to the asking entity by the integrated license server 234 based on the agreed parameters in a final media content rights transaction.

Figure 3:
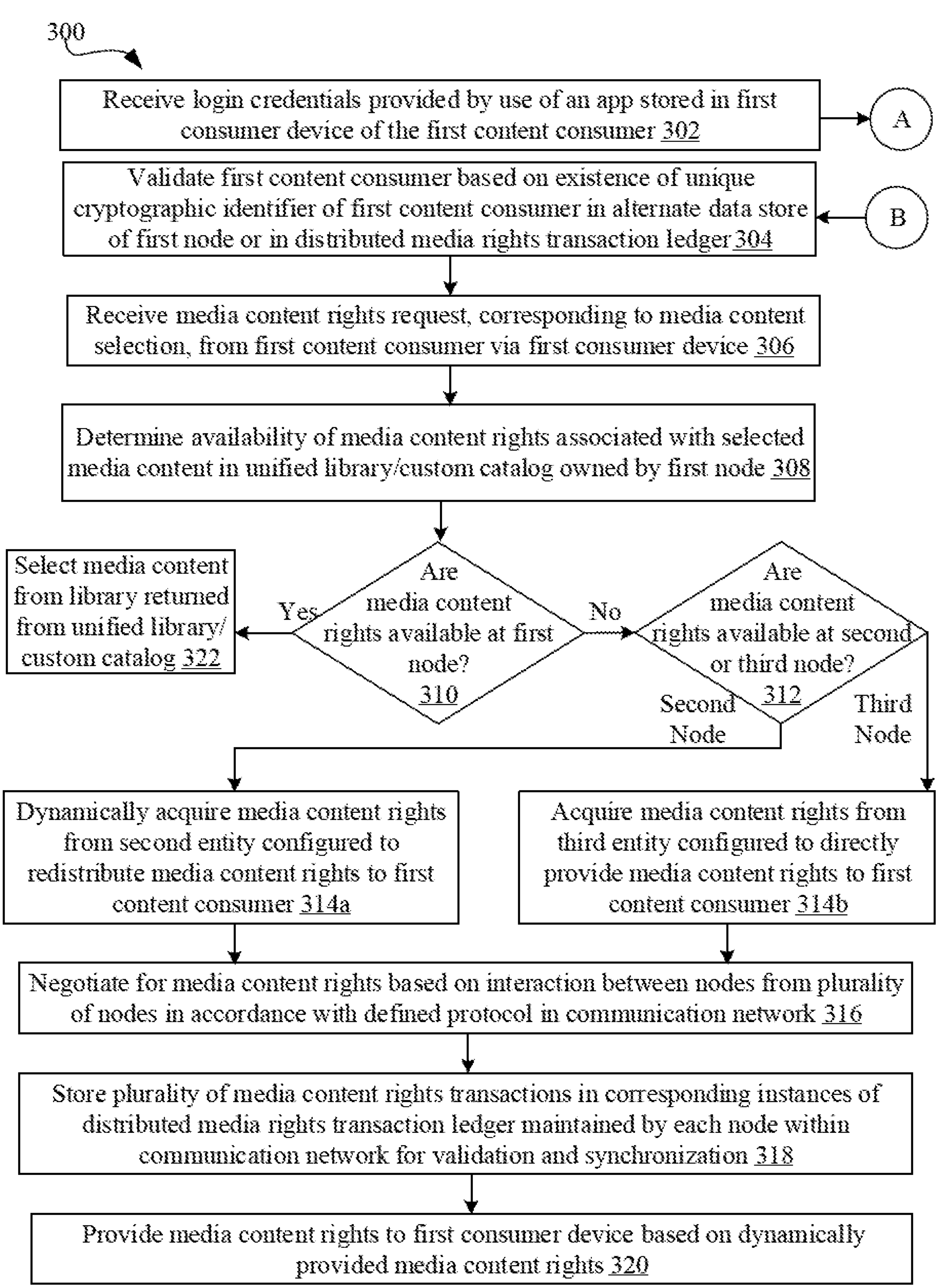
FIG. 3 depicts a flow chart illustrating exemplary operations for establishing a network of nodes and participants for dynamic management of media content rights in the ecosystem 100 of FIG. 1, in accordance with an exemplary embodiment of the disclosure.
Figure 4:
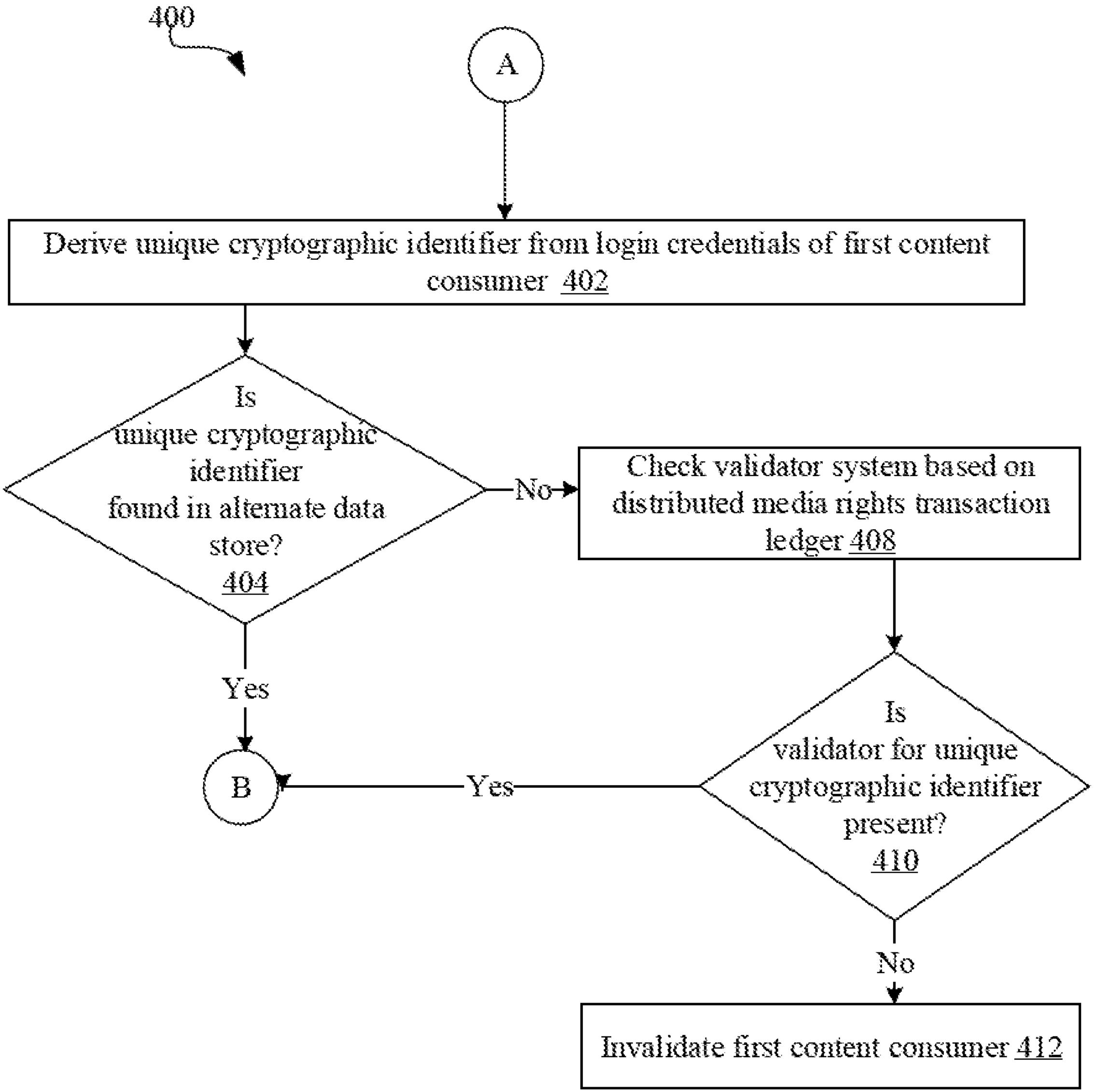
FIG. 4 depicts a flow chart illustrating exemplary operations for validation of an identity of a content consumer in a communication network of the ecosystem 100 of FIG. 1, in accordance with an exemplary embodiment of the disclosure.

FIG. 3 depicts a flow chart illustrating exemplary operations for establishing a network of nodes and participants for dynamic management of media content rights in the ecosystem 100 of FIG. 1, in accordance with an exemplary embodiment of the disclosure. With reference to FIG. 3, there is shown a flowchart 300. FIG. 4 depicts a flow chart illustrating exemplary operations for validation of an identity of a content consumer in a communication network of the ecosystem 100 of FIG. 1, in accordance with an exemplary embodiment of the disclosure. With reference to FIG. 4, there is shown a flowchart 400.

At 302, login credentials provided by use of an app stored in the first consumer device 114*a* of the first content consumer 110*a* may be received. In accordance with an embodiment, a node, such as the first node 102*a*, of the plurality of nodes 102*a*, . . . , 102*n* may be configured to receive login credentials, such as a username and a password, from the content consumer, such as the first content consumer 110*a*, via a consumer device, such as a first consumer device 114*a*. The first consumer device 114*a* may provide the login credentials by use of an app, for example, a mobile app or a TV app, stored in the first content consumer 110*a*.

In accordance with an embodiment, the first node 102*a* may correspond to the gateway system 202, such as the streaming media and VOD service provider. In accordance with an embodiment, the request may be received by the node, such as first node 102*a*, that is accessible to the plurality of consumer devices 114*a*, . . . , 114*n*, via the APIs 212. The APIs 212 may allow the plurality of content consumers 110*a*, . . . , 110*n* to interact with the plurality of nodes 102*a*, . . . , 102*n* in the communication network 106.

In accordance with an embodiment, the content consumer such as the first content consumer 110*a*, associated with the first consumer device 114*a*, may be a participant in the communication network 106 but may not be required to operate a node of the plurality of nodes 102*a*, . . . , 102*n*.

Referring to flowchart 400 in FIG. 4, at 402, a unique cryptographic identifier may be derived from the login credentials of the first content consumer 110*a*. In accordance with an embodiment, the first node 102*a* may be configured to derive the unique cryptographic identifier, such as a unique string of alphanumeric characters of defined length, from the login credentials of the first content consumer 110*a* by use of, for example a hashing algorithm, defined in the communication network 106. In accordance with various embodiments, the unique cryptographic identifier may be a public key-private key pair, a unique identifier, or a hash value corresponding to the first content consumer 110*a*.

At 404, it may be determined whether the unique cryptographic identifier is found in the alternate data store 214*a* associated with the first node 102*a*. The alternate data store 214*a* may be created using at least the distributed media rights transaction ledger 104, in which each new content consumer joining the communication network 106 is recorded as a media content rights transaction. In cases, where the unique cryptographic identifier of the first content consumer 110*a* is found in the alternate data store 214*a*, the control passes back to 304 in flowchart 300 of FIG. 3, else to 406.

At 406, validator system may be checked based on the distributed media rights transaction ledger 104. In accordance with an embodiment, the validator systems that may include entities that may have previously interacted with the first content consumer 110*a* may be checked using the distributed media rights transaction ledger 104. The validator system (not shown) may request to validate the identity of the first content consumer 110*a* from a prior entity representing, for example the direct broadcast satellite service provider, using the distributed media rights transaction ledger 104. When the first content consumer 110*a* is interacting through the first node 102*a*, which belongs to a given entity, that owns or acts on behalf of for example the gateway system 202, in the communication network 106, the first content consumer 110*a* may be considered to be owned by the first node 102*a*. This may secure the communication network 106 by ensuring that: a) first content consumer 110*a* transactions adhere to the defined protocol as enforced by the proxying node, for example the first node 102*a*; b) the entity that owns or acts on behalf of, for example the gateway system 202, assumes responsibility over media content rights transactions requested by the first content consumer 110*a*; and c) another entity, such as the validator, may request to validate the identity of the first content consumer 110*a* from a prior owner, for example another gateway system, using the distributed media rights transaction ledger 104.

At 408, it may be checked whether a validator is present for the unique cryptographic identifier using the distributed media rights transaction ledger 104. In an embodiment, a validator is found for the unique cryptographic identifier of the first content consumer 110*a* using the distributed media rights transaction ledger 104, and the control passes back to 304 in flowchart 300 of FIG. 3, else to 410.

At 410, the first content consumer 110*a* may be invalidated. In accordance with an embodiment, the first node 102*a* may invalidate the first content consumer 110*a* and deny an access to the communication network 106.

Referring to flowchart 300 in FIG. 3, at 304, the first content consumer 110*a* may be validated based on the existence of the unique cryptographic identifier of the first content consumer 110*a* in the alternate data store 214*a* of the first node 102*a* or in the distributed media rights transaction ledger 104. In accordance with an embodiment, the first node 102*a* may be configured to validate the first content consumer 110*a* based on the existence of the unique cryptographic identifier of the first content consumer 110*a* in the alternate data store 214*a* of the first node 102*a* or in the distributed media rights transaction ledger 104. In another embodiment, the first content consumer 110*a* may be validated based on presence of the validator for the unique cryptographic identifier of the first content consumer 110*a*. Control passes to 306 for such validation of the first content consumer 110*a*.

At 306, media content rights request, corresponding to media content selection from the first content consumer 110*a* via the first consumer device 114*a*, may be received. In accordance with an embodiment, the first node 102*a* may be configured to receive media content rights request, corresponding to media content selection, from the first content consumer 110*a* via the first consumer device 114*a*.

At 308, availability of the media content rights associated with the selected media content may be determined in the unified library/custom catalog 214*b* owned by the first node 102*a*. The unified library/custom catalog 214*b* may correspond to a collection of media content belonging to one or more entities having media content rights available for acquisition, distribution, and/or consumption. In accordance with an embodiment, first content consumer 110*a* may provide a selection of a new media content which is not presented by the unified library/custom catalog 214*b*. For example, the unified library/custom catalog 214*b* may include media content that is previously purchased by the first content consumer 110*a* (for example, iTunes®), media content owned the first node 102*a* (for example Netflix®), media content for which the first node 102*a* (for example Netflix®) has rights to redistribute, and media content (for example media content from Disney®) for which the first node 102*a* (for example Netflix®) does not have media content rights.

At 310, it may be determined whether the media content rights (associated with selected media content) are available. In accordance with an embodiment, the first node 102*a* may determine whether the media content rights (associated with selected media content) are available in the unified library/custom catalog 214*b* owned by the first node 102*a*. In this regard, it may be determined whether the first content consumer 110*a* or the first entity 108*a* associated with the first node 102*a* have an access of the media content rights associated with the selected media content in the unified library/custom catalog 214*b* owned by the first node 102*a*.

In accordance with an embodiment, the first node 102*a* may determine that the media content rights (associated with selected media content) are available in the unified library/custom catalog 214*b*. Accordingly, the control passes to 322. In accordance with another embodiment, the first node 102*a* may determine that the media content rights (associated with selected media content) are not available in the unified library/custom catalog 214*b*. Accordingly, the control passes to 312.

At 322, when the media content rights associated with the selected media content are available at the first node 102*a*, the media content may be selected from the unified library/custom catalog 214*b* provided by the first node 102*a*. In this regard, the first content consumer 110*a* may select the media content from the unified library/custom catalog 214*b* identified, prepared, and presented by first node 102*a*. The first entity 108*a* who owns the gateway node, such as the first node 102*a*, may act on behalf of the first content consumer 110*a* to acquire the media content rights to consume the media content and gather metadata associated with the available media content.

At 312, it may be determined whether the media content rights (associated with selected media content) are available with the second entity or the third entity. In accordance with an embodiment, the first node 102*a* may determine that the media content rights (associated with selected media content) are available with the second entity, for example the content distributor system 204, associated with the second node 102*b*. Accordingly, control passes to 314*a*. In accordance with another embodiment, the first node 102*a* may determine that the media content rights (associated with selected media content) are available with the third entity, for example the content owner system 206, associated with the third node 102*c*. Accordingly, control passes to 314*b*.

At 314*a*, the media content rights may be dynamically acquired from the second entity associated with the second node 102*b* configured to redistribute the media content rights to the first content consumer 110*a*. In accordance with an embodiment, the first node 102*a* may be configured to dynamically acquire the media content rights from the second entity associated with a second node 102*b* (that may redistribute the media content rights to the first content consumer 110*a*) by negotiating with the second entity associated with the second node 102*b* that has the media content rights to redistribute. In accordance with an embodiment, the first entity 108*a* associated with the first node 102*a* may be configured to acquire the media content rights from the second entity associated with the second node 102*b* when the first content consumer 110*a* or the first entity 108*a* associated with the first node 102*a* do not have an access of media content rights associated with the selected media content. In such embodiment, second entity (such as a content distributor) associated with the second node 102*b* may have media content rights to distribute (or re-distribute) the first media asset, previously acquired from a third entity (such as a content owner) associated with the third node 102*c*. Thus, the first entity 108*a* associated with the first node 102*a* of the plurality of nodes 102*a* . . . , 102*n* interacts with the corresponding instance of the distributed media rights transaction ledger 104 in the communication network 106, may act on behalf of the first content consumer 110*a* to acquire one or more media content rights for consumption of the media content by the first consumer device 110*a*.

At 314*b*, the media content rights may be acquired from the third entity associated with the third node 102*c* configured to directly provide the media content rights to the first content consumer 110*a*. In accordance with an embodiment, the first node 102*a* may be configured to acquire the media content rights from the third entity associated with the third node 102*c* (that may directly provide the media content rights) by negotiating with the third entity associated with the third node 102*c* that owns the media content and associated media content rights. In this regard, the first content consumer 110*a* may consume the media content directly from the third entity associated with the third node 102*c* via the first node 102*a*. Thus, the first entity 108*a* associated with the first node 102*a* of the plurality of nodes 102*a* . . . , 102*n* interacts with the corresponding instance of the distributed media rights transaction ledger 104 in the communication network 106, may act on behalf of the first content consumer 110*a* to acquire one or more media content rights for consumption of the media content by the first consumer device 110*a*.

At 316, the media content rights may be negotiated for, based on interaction between nodes from the plurality of nodes 102*a*, . . . , 102*n* in accordance with defined protocol in the communication network 106. In accordance with an embodiment, the first entity 108*a* associated with the first node 102*a* may be configured to negotiate with the second entity associated with the second node 102*b* or the third entity associated with the third node 102*c* for acquisition of the media content rights, based on interaction between nodes from plurality of nodes 102*a*, . . . , 102*n* in accordance with defined protocol in the communication network 106.

As described in FIG. 1, each node of the plurality of nodes 102*a*, . . . , 102*n* may be associated with a corresponding entity, such as a content owner or a content distributor, from the plurality of entities 108*a*, . . . , 108*n*. In accordance with an embodiment, the first node 102*a* may be configured to create at least one media content rights transaction with one or more nodes, such as the second node 102*b* or the third node 102*c* of the plurality of nodes 102*a*, . . . , 102*n*. The one or more nodes may further cryptographically secure transaction data of the at least one media content rights transaction, which is stored in corresponding instance of the distributed media rights transaction ledger 104. In accordance with an embodiment, the one or more nodes may digitally sign the hash transaction data with a private key of a private key-public key pair, and share a public key of the private key-public key pair with remaining nodes of the plurality of nodes 102*a*, . . . , 102*n* and maintains the private key as a secret key.

The one or more media content rights transactions may comprise at least one of a cryptographic signature of an originating entity associated with a corresponding node, another cryptographic signature of a recipient entity, identities of the one or more media content rights for a specific media content, negotiated terms of the one or more media content rights, identities of one or more participants, disparate live media output stream for consumption by a content consumer and/or pre-encoded media asset, a descriptor for an intent of a transaction, an encrypted summary of a set of transactions, one or more cryptographic signatures of historic transactions from the distributed media rights transaction ledger 104 to link at least two transactions, and a cryptographic hash of transaction data. In accordance with an embodiment, each of the plurality of media content rights transactions 112*a*, . . . , 112*n* may be categorized based on an announcement of a newly created entity, an announcement of a newly created content consumer, an announcement of a newly available media content, an acquisition of the one or more media content rights, and/or a consumption of the media content by a content consumer. In accordance with an embodiment, an invalid transaction may be added to the distributed media rights transaction ledger 104, remains invalid, and serves as a historical record of origin of invalid transactions.

In accordance with an embodiment, the first node 102_a_ of the plurality of nodes 102_a_, . . . , 102_n_ may be configured to manage at least one media content rights transaction of a plurality of media content rights transactions 112_a_, . . . , 112_n_ with remaining nodes, such as the one or more nodes of the plurality of nodes 102_a_, . . . , 102_n_. The plurality of media content rights transactions 112_a_, . . . , 112_n_ may be managed by the plurality of nodes 102_a_, . . . , 102_n_ in accordance with the defined protocol in the communication network 106.

In accordance with an embodiment, the plurality of media content rights transactions 112_a_, . . . , 112_n_ may originate from a node, for example the first node 102_a_ of the plurality of nodes 102_a_, . . . , 102_n_, and facilitate exchange of data with one or more nodes, such as the second node 102_b_ or the third node 102_c_, in the communication network 106.

In accordance with various embodiments, a node of the plurality of nodes 102_a_, . . . 102_n_ may be further configured to verify one or more media content rights transactions of the plurality of media content rights transactions 112_a_, . . . , 112_n_ communicated by the one or more remaining nodes of the plurality of nodes 102_a_, . . . , 102_n_. Further, the node may reject a set of invalid media content rights transactions from the one or more media content rights transactions 112_a_, . . . , 112_n_. Furthermore, the node may create new media content rights transactions on behalf of at least one of a content consumer, content distributor, or content owner, and communicate the new media content rights transactions to the one or more remaining nodes where such new media content rights transactions may be stored in corresponding instances of the distributed media rights transaction ledger 104. In this regard, a receiving entity, such as the second and the third entities, may be responsible for cryptographically securing the entire set of media content rights transactions associated with the negotiation of media content rights, for example as a summary hash. The receiving entity may sign the summary has with its private key (of the same private key-public key pair used throughout the communication network 106 for corresponding entity). The receiving entity may be configured to collect the summary hash and broadcast as a media content rights transaction to the entire communication network 106 to be added as a new media content rights transaction on the distributed media rights transaction ledger 104. The entities participating in the media content rights negotiations may elect to encrypt the details of the negotiation sequence to obscure the parameters of the final media content rights transaction from the distributed media rights transaction ledger 104.

In accordance with an embodiment, the node may be further configured to enforce a plurality of constraints associated with the one or more media content rights defined in at least one transaction of the plurality of media content rights transactions 112_a_, . . . , 112_n_ for a participant to acquire, distribute, or consume content associated with the one or more media content rights. Examples of the plurality of constraints may include, but are not limited to date/time range restriction of playback and/or length of media content rights transferal, rights transferal to specific receiving entity and/or restricted content consumers, number of times playback is allowed, possibility to transfer playback right to another content consumer or entity, downloading/offline access of media content rights and/or playback restrictions, whether sending and receiving entities can watch the media content simultaneously or if mutually exclusive rights transferal is permitted wherein only one party (i.e., either sending or receiving entities) can watch the media content at any moment in time, consumer device-related restrictions (for example mobile only, and no TVs allowed), and/or media content quality restrictions (for example, high definition is not available). In accordance with an embodiment, the node may be further configured to enforce an adherence of known nodes to the protocol by refusing or accepting to communicate with the known nodes of the plurality of nodes 102_a_, . . . 102_n_.

In accordance with an embodiment, the node, such as the first node 102_a_, may be further configured to create respective private channels to communicate private media content rights transactions between two entities via nodes, such as the second node 102_b_ or the third node 102_c_, associated with respective entities. Each node may represent at least one participant on the communication network 106 based on signed transactions originated from the node with a cryptographic signature of corresponding participant. In accordance with an embodiment, the node may be further configured to determine one or more new nodes which join the communication network 106 within a defined time period, and communicate information associated with the plurality of nodes 102_a_, . . . , 102_n_ to the one or more new nodes.

At 318, the plurality of media content rights transactions 112_a_, . . . , 112_n_ may be stored in corresponding instances of the distributed media rights transaction ledger 104 maintained by each node within the communication network 106 for validation and synchronization. In accordance with an embodiment, the plurality of media content rights transactions 112_a_, . . . , 112_n_ may be stored in corresponding instances of the distributed media rights transaction ledger 104 maintained by each node of the plurality of nodes 102_a_, . . . , 102_n_ within the communication network 106 for validation and synchronization. Each instance of the distributed media rights transaction ledger 104 may include the plurality of media content rights transactions 112_a_, . . . , 112_n_ categorized and defined based on the defined protocol. In accordance with an embodiment, the one or more nodes of the plurality of nodes 102_a_, . . . 102_n_ associated with the plurality of participants 108_a_, . . . , 108_n_ and 110_a_, . . . , 110_n_ may be configured to store the plurality of media content rights transactions 112_a_, . . . , 112_n_ in corresponding instances of the distributed media rights transaction ledger 104 maintained by each node of the plurality of nodes 102_a_, . . . , 102_n_ within the communication network 106 for validation and synchronization. In this regard, each node may append its own media content right transactions as well as media content right transactions from other nodes in its own instance of the distributed media rights transaction ledger 104.

In accordance with various embodiments, the distributed media rights transaction ledger 104 may be configured to maintain, across the plurality of participants 108_a_, . . . , 108_n_ and 110_a_, . . . , 110_n_, a validated state of the one or more media content rights granted. The distributed media rights transaction ledger 104 may maintain a secured and validated historical record of consumption of the media content by the plurality of content consumers 110_a_, . . . , 110_n_, and maintain secured and validated identities of the plurality of participants 108_a_, . . . , 108_n_ and 110_a_, . . . , 110_n_. The distributed media rights transaction ledger 104 may further maintain a history of constraints for acquisition, distribution, consumption, and transfer of ownership of the one or more media content rights. The distributed media rights transaction ledger 104 may further maintain a history of negotiations via a sequence of media content rights transactions which occur between at least two participants of the plurality of participants 108*a*, . . . , 108*n* and 110*a*, . . . , 110*n*.

In accordance with an embodiment, data for the plurality of media content rights transactions 112*a*, . . . , 112*n* for the distributed media rights transaction ledger 104 may be synchronized across the plurality of nodes 102*a*, . . . , 102*n* in the communication network 106. Thus, the distributed media rights transaction ledger 104 may be secured to ensure integrity of data shared across the plurality of nodes 102*a*, . . . , 102*n*. In accordance with an embodiment, the at least one node of the plurality of nodes 102*a*, . . . , 102*n* may be further configured to maintain a corresponding instance of the distributed media rights transaction ledger 104 and communicate the corresponding instance of the distributed media rights transaction ledger 104 to the one or more remaining nodes upon request.

At 320, the media content rights may be provided to the first consumer device 114*a* based on the dynamically provided media content rights. In accordance with an embodiment, the first node 102*a* may be configured to provide the media content rights acquired from the second node 102*b* or the third node 102*c* to the first consumer device 114*a*. In accordance with an embodiment, the media player of the first consumer device 114*a* may be provided a link of the media content from the media content master repository 222 of the third entity associated with the third node 102*c* to start viewing the media content based on the dynamically acquired rights.

Figure 5:
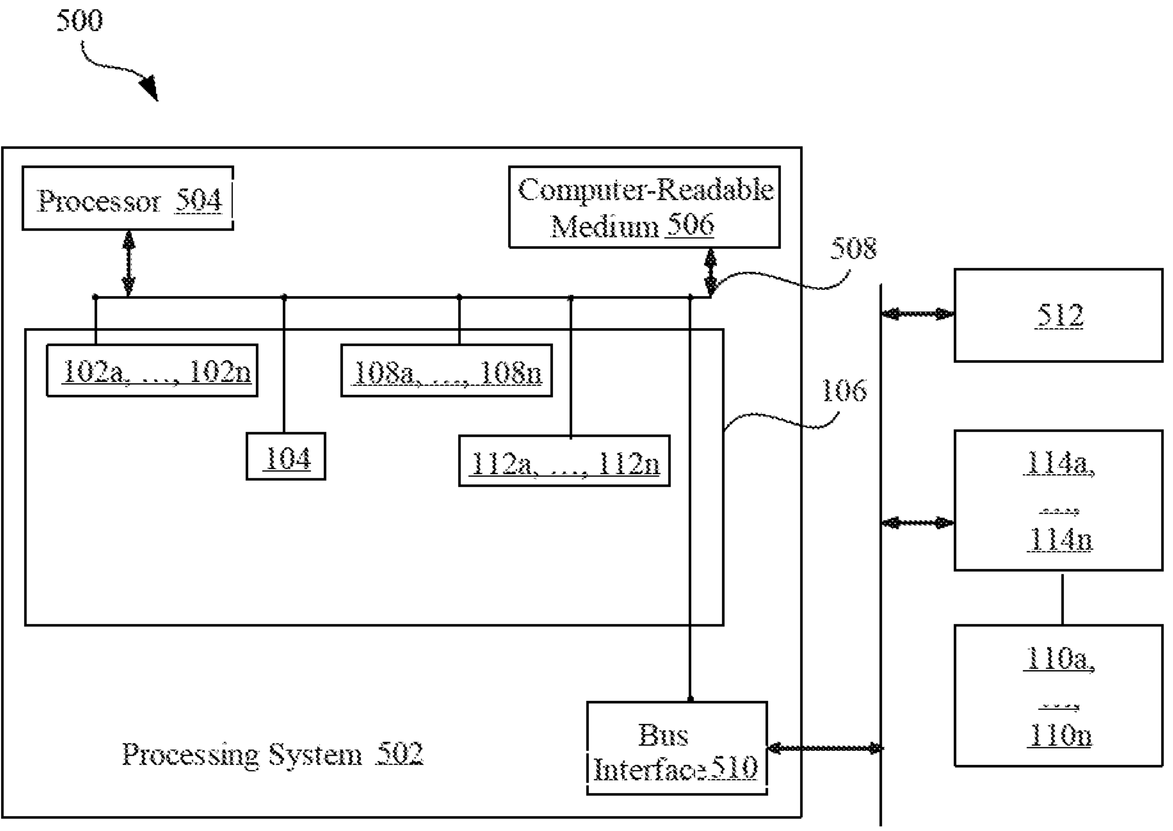
FIG. 5 is a conceptual diagram illustrating an example of a hardware implementation for a system employing a processing system for establishing a network of nodes and participants for dynamic management of media content rights, in accordance with an exemplary embodiment of the disclosure.

FIG. 5 is a conceptual diagram illustrating an example of a hardware implementation for a system employing a processing system for establishing a network of nodes and participants for dynamic management of media content rights, in accordance with an exemplary embodiment of the disclosure. Referring to FIG. 5, the hardware implementation shown by a representation 500 for the ecosystem 100 employs a processing system 502 for establishing a network of nodes and participants for dynamic management of media content rights, in accordance with an exemplary embodiment of the disclosure, as described herein.

In some examples, the processing system 502 may comprise one or more hardware processors 504, a non-transitory computer-readable medium 506, a bus 508, a bus interface 510, and a transceiver 512. FIG. 5 further illustrates the plurality of nodes 102*a*, . . . , 102*n*, the distributed media rights transaction ledger 104, the plurality of entities 108*a*, . . . , 108*n*, and the plurality of media content rights transactions 112*a*, . . . , 112*n*, as described in detail in FIG. 1.

The hardware processor 504 may be configured to manage the bus 508 and general processing, including the execution of a set of instructions stored on the non-transitory computer-readable medium 506. The set of instructions, when executed by the hardware processor 504, causes the ecosystem 100 to execute the various functions described herein for any particular apparatus. The hardware processor 504 may be implemented, based on a number of processor technologies known in the art. Examples of the hardware processor 504 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 506 may be used for storing data that is manipulated by the hardware processor 504 when executing the set of instructions. The data is stored for short periods or in the presence of power. The non-transitory computer-readable medium 506 may also be configured to store data for the plurality of nodes 102*a*, . . . , 102*n*, the distributed media rights transaction ledger 104, the plurality of entities 108*a*, . . . , 108*n*, and the plurality of media content rights transactions 112*a*, . . . , 112*n*.

The bus 508 is configured to link together various circuits. In this example, the ecosystem 100 employing the processing system 502 and the non-transitory computer-readable medium 506 may be implemented with bus architecture, represented generally by bus 508. The bus 508 may include any number of interconnecting buses and bridges depending on the specific implementation of the ecosystem 100 and the overall design constraints. The bus interface 510 may be configured to provide an interface between the bus 508 and other circuits, such as, transceiver 512, and external devices, such as the plurality of consumer devices 114*a*, . . . , 114*n* associated with respective content consumers of the plurality of content consumers 110*a*, . . . 110*n*.

The transceiver 512 may be configured to provide a communication of the communication network 106 with various other apparatus, such as the plurality of consumer devices 114*a*, . . . , 114*n* associated with respective content consumers of the plurality of content consumers 110*a*, . . . , 110*n*, via the network 116. The transceiver 512 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 5 may include software whose corresponding code may be executed by at least one processor, for across multiple processing environments. For example, the plurality of nodes 102*a*, . . . , 102*n*, the distributed media rights transaction ledger 104, the plurality of entities 108*a*, . . . , 108*n*, and the plurality of media content rights transactions 112*a*, . . . , 112*n*, may include software that may be executed across a single or multiple processing environments.

In an aspect of the disclosure, the hardware processor 504, the non-transitory computer-readable medium 506, or a combination of both may be configured or otherwise specially programmed to execute the operations or functionality of the plurality of nodes 102*a*, . . . , 102*n*, the distributed media rights transaction ledger 104, the plurality of entities 108*a*, . . . , 108*n*, and the plurality of media content rights transactions 112*a*, . . . , 112*n*, or various other components described herein, as described with respect to FIGS. 1 to 4.

Various embodiments of the disclosure comprise the ecosystem 100 that may be configured to establish a network of nodes and participants for dynamic management of media content rights. In an embodiment, the ecosystem 100 may comprise a plurality of nodes 102*a*, . . . , 102*n* configured to interact with each other in accordance with a defined protocol in the communication network 106. At least one node of the plurality of nodes 102*a*, . . . , 102*n* may be associated with a corresponding participant interacts with one of remaining nodes of the plurality of nodes 102*a*, . . . , 102*n* associated with a participant which owns media content and maintains control over enforcement of media content rights associated with the media content. The at least one node of the plurality of nodes 102*a*, . . . , 102*n* may be configured to manage at least one media content rights transaction of a plurality of media content rights transactions 112*a*, . . . , 112*n* with one or more remaining nodes of the plurality of nodes 102*a*, . . . , 102*n*. The plurality of media content rights transactions 112*a*, . . . , 112*n* may be managed by the plurality of nodes 102*a*, . . . , 102*n* in accordance with the defined protocol in the communication network 106. The ecosystem 100 may further comprise a plurality of instances of a distributed media rights transaction ledger 104 associated with a respective node of the plurality of the nodes 102*a*, . . . , 102*n*. Each instance of the distributed media rights transaction ledger 104 may include the plurality of media content rights transactions 112*a*, . . . , 112*n* categorized and defined based on the defined protocol.

In accordance with an embodiment, the at least one node of the plurality of nodes 102*a*, . . . , 102*n* may be further configured to maintain a corresponding instance of the distributed media rights transaction ledger 104 and communicate the corresponding instance of the distributed media rights transaction ledger 104 to the one or more remaining nodes upon request.

In accordance with an embodiment, the at least one node of the plurality of nodes 102*a*, . . . , 102*n* may be further configured to verify the one or more media content rights transactions of the plurality of media content rights transactions 112*a*, . . . , 112*n*, wherein the one or more media content rights transactions are communicated by the one or more remaining nodes, reject a set of invalid media content rights transactions from the one or more media content rights transactions, create new media content rights transactions on behalf of at least one of a content consumer, content distributor, or content owner, and communicate the new media content rights transactions to the one or more remaining nodes.

In accordance with an embodiment, the at least one node of the plurality of nodes 102*a*, . . . , 102*n* may be further configured to determine one or more new nodes which joined the communication network 106 within a defined time period, and communicate information associated with the plurality of nodes 102*a*, . . . , 102*n* to the one or more new nodes.

In accordance with an embodiment, the corresponding participant may be an entity or a content consume. The entity may be one of a content owner and a content distributor. The content owner may own one or more media contents and associated one or more media content rights. The content distributor may acquire the one or more media content rights from the content owner or a different content distributor for further redistribution to the different content distributor or the content owner. The content consumer may be associated with at least one consumer device which executes the one or more media content rights to acquire licenses to consume the media content.

In accordance with an embodiment, a node of the plurality of nodes 102*a*, . . . , 102*n* that is configured to act as an electronic gateway, such as the gateway system 202, for a consumer device associated with the content consumer to connect with at least one node of the plurality of nodes 102*a*, . . . , 102*n*. The node of the plurality of nodes 102*a*, . . . , 102*n* may be further configured to determine an identity of the content consumer from credentials of the content consumer. The identity may be derived from a globally unique cryptographic identifier associated with the content consumer and determine that the identity of the content consumer exists in an alternate data store, such as the alternate data store 214*a*, that is created based on at least a corresponding instance of the distributed media rights transaction ledger 104. The alternate data store 214*a* may include a set of transactions of the plurality of media content rights transactions that correspond to records of the plurality of content consumers 110*a*, . . . , 110*n* that joins the communication network 106 as new content consumers and validate the content consumer based on the existence of the identity of the content consumer in the alternate data store 214*a*.

In accordance with an embodiment, an entity associated with the node of the plurality of nodes 102*a*, . . . , 102*n* may interact with the corresponding instance of the distributed media rights transaction ledger 104 in the communication network 106, acts on behalf of the content consumer to acquire one or more media content rights to consume the media content.

In accordance with an embodiment, an entity associated with the node of the plurality of nodes 102*a*, . . . , 102*n* may present metadata of a plurality of content libraries as a unified library.

In accordance with an embodiment, the at least one node of the plurality of nodes 102*a*, . . . , 102*n* may be further configured to create respective private channels to communicate private media content rights transactions between two entities.

In accordance with an embodiment, the at least one node may be further configured to enforce a plurality of constraints associated with the one or more media content rights defined in at least one transaction of the plurality of media content rights transactions 112*a*, . . . , 112*n* for a participant to acquire, distribute, or consume content associated with the one or more media content rights.

In accordance with an embodiment, each node may represent at least one participant on the communication network 106 based on signed transactions originated from the node with a cryptographic signature of corresponding participant.

In accordance with an embodiment, an entity may become an owner of a content consumer when the content consumer is proxied through at least one node associated with the entity to the communication network 106.

In accordance with an embodiment, the distributed media rights transaction ledger 104 may be secured to ensure integrity of data shared across the plurality of nodes 102*a*, . . . 102*n*.

In accordance with an embodiment, data for the media content rights transactions for the distributed media rights transaction ledger 104 may be synchronized across the plurality of nodes 102*a*, . . . , 102*n* in the communication network 106. In accordance with an embodiment, the distributed media rights transaction ledger 104 may be further configured to maintain, across the plurality of participants 108*a*, . . . , 108*n* and 110*a*, . . . , 110*n*, a validated state of the one or more media content rights granted, maintain a secured and validated historical record of consumption of media content by one or more content consumers, maintain secured and validated identities of the plurality of participants, maintain a history of constraints for acquisition, distribution, consumption, and transfer of ownership of the one or more media content rights, and maintain a history of negotiations via a sequence of media content rights transactions which occur between at least two participants.

In accordance with an embodiment, the plurality of media content rights transactions 112*a*, . . . , 112*n* may originate from at least one node of the plurality of nodes 102*a*, . . . , 102*n* and facilitates exchange of data with the plurality of nodes 102*a*, . . . , 102*n* in the communication network 106.

In accordance with an embodiment, the plurality of media content rights transactions 112*a*, . . . , 112*n* may be stored in instances of the distributed media rights transaction ledger 104 maintained by each node of the plurality of nodes 102*a*, . . . , 102*n* within the communication network 106 for validation and synchronization.

In accordance with an embodiment, the one or more media content rights transactions comprise at least one of a cryptographic signature of an originating entity associated with a corresponding node, another cryptographic signature of a recipient entity, identities of the one or more media content rights for a specific media content, negotiated terms of the one or more media content rights, identities of one or more participants, disparate live media output stream for consumption by a content consumer and/or pre-encoded media asset, a descriptor for an intent of a transaction, an encrypted summary of a set of transactions, one or more cryptographic signatures of historic transactions from the distributed media rights transaction ledger 104 to link at least two transactions, and a cryptographic hash of transaction data, and wherein each of the plurality of media content rights transactions 112*a*, . . . , 112*n* is categorized based on an announcement of a newly created entity, an announcement of a newly created content consumer, an announcement of a newly available media content, an acquisition of the one or more media content rights, and a consumption of the media content by a content consumer.

In accordance with an embodiment, a node of the plurality of nodes 102*a*, . . . , 102*n* may be further configured to create at least one media content rights transaction and cryptographically hash transaction data of the at least one media content rights transaction, which is stored in corresponding instance of the distributed media rights transaction ledger 104. In accordance with an embodiment, the node of the plurality of nodes 102*a*, . . . , 102*n* may be further configured to digitally sign the hash transaction data with a private key of a private key-public key pair and share a public key of the private key-public key pair with remaining nodes of the plurality of nodes 102*a*, . . . , 102*n* and maintain the private key as a secret key.

In accordance with an embodiment, an invalid transaction may be added to the distributed media rights transaction ledger 104, remains invalid, and wherein the invalid transaction may serve as a historical record of origin of invalid transactions. In accordance with an embodiment, the communication network 106 may be a distributed communication network.

Various embodiments of the disclosure may provide a computer-readable medium, such as the non-transitory computer-readable medium 506, having stored thereon, computer-implemented instruction that when executed by the processor 504 causes the ecosystem 100 to establish a network of nodes and participants for dynamic management of media content rights. In accordance with an embodiment, the processor 504 causes the ecosystem 100 to execute operations to configure the plurality of nodes 102*a*, . . . , 102*n* to interact with each other in accordance with a defined protocol in the communication network 106. At least one node of the plurality of nodes 102*a*, . . . , 102*n* may be associated with a corresponding participant interacts with one of remaining nodes of the plurality of nodes 102*a*, . . . , 102*n* associated with a participant which owns media content and maintains control over enforcement of media content rights associated with the media content. The at least one node of the plurality of nodes 102*a*, . . . , 102*n* may be configured to manage at least one media content rights transaction of a plurality of media content rights transactions 112*a*, . . . , 112*n* with one or more remaining nodes of the plurality of nodes 102*a*, . . . , 102*n*. The plurality of media content rights transactions 112*a*, . . . , 112*n* may be managed by the plurality of nodes 102*a*, . . . , 102*n* in accordance with the defined protocol in the communication network 106. The system may further comprise a plurality of instances of a distributed media rights transaction ledger 104 associated with a respective node of the plurality of the nodes 102*a*, . . . , 102*n*. Each instance of the distributed media rights transaction ledger 104 may include the plurality of media content rights transactions 112*a*, . . . , 112*n* categorized and defined based on the defined protocol.

Managing the content rights of millions of media content, by thousands of content owners, content distributors, and tracking a flow of content rights from one entity to other entity, is a herculean task. Currently, content rights clearance and negotiations are very time consuming, and backed by readily accessible/usable data. Further, multiple content libraries by various entities, require separate subscriptions and make it difficult for users to navigate to content of their choice freely without having individual subscription. Further, third party measurement of viewership of a content item, are costly. There is no mechanism to precisely track content rights and royalties for various entities. Further, isolated content catalogs and third-party dependencies to estimate viewership for a content item, such as a TV show, to plan for future advertisement inventory needs and obligations, increase complexities. This in turn increases rework and requires installation of large infrastructures and resources to maintain uninterrupted content delivery for existing channel and limits the ability of the broadcast or network provider to change content, provide customized content in real time or near-real time.

The disclosed system and method for dynamic acquisition, re-distribution, enforcement, and tracking of content rights of media content, has several advantages, for example, a) Providing tokenized and secure content licenses for a media asset; b) Ease-of-use and sharing of catalogs, revenue, content rights makes pirating unjustified; c) content distributors are able to dynamically acquire rights from content owners and pass on the rights to the consumers in real time or near real-time; d) instant user-targeted catalogs may be identified and prepared and pushed to apps, such as a mobile app or a TV app, at consumer devices; e) the ecosystem provides a platform for creation of a marketplace where new media markets, such as a content trading market may emerge; f) content development is user-driven/user-funded; g) digital currency, for example, digital crypto-currencies, may be used easily in network due to the inherent framework of network; h) enables instant settlements using the distributed media rights transaction ledger; and i) simplified, secured, real time, ensured, and fail-safe tracking of media content rights among various participants of the ecosystem.

As utilized herein the terms "circuits" and "circuitry" refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, which have been contemplated to be within the scope of the claimed subject matter. In addition, for each of the embodiments described herein, the corresponding form of any such embodiments may be described herein as, for example, "logic configured to" perform the described action.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made, and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system comprising one or more processors and at least one memory storing instructions that, when executed by the one or more processors, cause the one or more processors to:

receive, by a first node of a plurality of nodes and from a first consumer device associated with a first content consumer, a media content rights request corresponding to a content consumer credential associated with the first content consumer and identifying a media content selection of the first content consumer;

identify, by the first node and using an instance of a distributed media rights transaction ledger, an availability of a media content item corresponding to the media content selection based on (i) one or more granted media content rights associated with the media content item and (ii) a unique cryptographic identifier corresponding to the content consumer credential;

retrieve, by the first node, one or more media content rights transactions of a plurality of media content rights transactions stored in the distributed media rights transaction ledger;

determine, by the first node and based on one or more of the one or more media content rights transactions, that ownership of the media content item is associated with a third node of the plurality of nodes, wherein determining the ownership of the media content item comprises at least verifying a cryptographic signature associated with the third node;

determine, by the first node and based on one or more of the one or more media content rights transactions, that the third node has granted, to a second node of the plurality of nodes, media content rights to distribute the media content item, wherein acquiring first media content rights associated with the media content item on behalf of the first content consumer from the second node takes less network time than acquiring the first media content rights from the third node based on the second node having been previously granted the media content rights to distribute the media content item by the third node;

acquire, by the first node and by negotiating with the second node, the first media content rights associated with the media content item on behalf of the first content consumer; and responsive to acquiring the first media content rights associated with the media content item, (i) provide, by the first node and to the first consumer device, data indicative of the media content item;

(ii) generate, by the first node, a media content right transaction based on the unique cryptographic identifier and the media content item; and (iii) update, by the first node, the distributed media rights transaction ledger based on the media content right transaction.

2. The system of claim 1, wherein the media content selection identifies a selection of the media content item from a unified library/custom catalog corresponding to the instance of the distributed media rights transaction ledger.

3. The system of claim 2, wherein the unified library/custom catalog is generated, using the instance of the distributed media rights transaction ledger, based on a consumption pattern of the first content consumer.

4. The system of claim 2, wherein the unified library/custom catalog comprises a collection of media content associated with the plurality of nodes.

5. The system of claim 4, wherein the data indicative of the media content item comprises a link to the media content item from a media content master repository of the second node.

6. The system of claim 5, wherein the link is configured to enable a presentation of the media content item.

7. The system of claim 4, wherein each of the plurality of nodes comprises a separate instance of the distributed media rights transaction ledger.

8. The system of claim 7, wherein the distributed media rights transaction ledger comprises a plurality of media content rights transactions categorized and defined based on a defined protocol.

9. The system of claim 8, wherein the instance of the distributed media rights transaction ledger comprises a local copy of the distributed media rights transaction ledger associated with the first node.

10. The system of claim 9, wherein updating the distributed media rights transaction ledger comprises providing the media content right transaction to the plurality of nodes.

11. A computer-implemented method, the computer-implemented method comprising:

receiving, by one or more processors of a first node of a plurality of nodes and from a first consumer device associated with a first content consumer, a media content rights request corresponding to a content consumer credential associated with the first content consumer and identifying a media content selection of the first content consumer;

identifying, by the one or more processors of the first node and using an instance of a distributed media rights transaction ledger, an availability of a media content item corresponding to the media content selection based on (i) one or more granted media content rights associated with the media content item and (ii) a unique cryptographic identifier corresponding to the content consumer credential;

retrieving, by the one or more processors of first node, one or more media content rights transactions of a plurality of media content rights transactions stored in the distributed media rights transaction ledger;

determining, by the one or more processors of the first node and based on one or more of the one or more media content rights transactions, that ownership of the media content item is associated with a third node of the plurality of nodes, wherein determining the ownership of the media content item comprises at least verifying a cryptographic signature associated with the third node;

determining, by the one or more processors of the first node and based on one or more of the one or more media content rights transactions, that the third node has granted, to a second node of the plurality of nodes, media content rights to distribute the media content item, wherein acquiring first media content rights associated with the media content item on behalf of the first content consumer from the second node takes less network time than acquiring the first media content rights from the third node based on the second node having been previously granted the media content rights to distribute the media content item by the third node;

acquiring, by the one or more processors of the first node and by negotiating with the second node, the first media content rights associated with the media content item on behalf of the first content consumer; and responsive to acquiring the first media content rights associated with the media content item, (i) providing, by the one or more processors of the first node and to the first consumer device, data indicative of the media content item;

(ii) generating, by the one or more processors of the first node, a media content right transaction based on the unique cryptographic identifier and the media content item; and (iii) updating, by the one or more processors of the first node, the distributed media rights transaction ledger based on the media content right transaction.

12. The computer-implemented method of claim 11, wherein the media content selection identifies a selection of the media content item from a unified library/custom catalog corresponding to the instance of the distributed media rights transaction ledger.

13. The computer-implemented method of claim 12, wherein the unified library/custom catalog is generated, using the instance of the distributed media rights transaction ledger, based on a consumption pattern of the first content consumer.

14. The computer-implemented method of claim 12, wherein the unified library/custom catalog comprises a collection of media content associated with the plurality of nodes.

15. The computer-implemented method of claim 14, wherein the data indicative of the media content item comprises a link to the media content item from a media content master repository of the second node.

16. One or more non-transitory computer-readable storage media including instructions that, when executed by one or more processors, cause the one or more processors to:

receive, by a first node of a plurality of nodes and from a first consumer device associated with a first content consumer, a media content rights request corresponding to a content consumer credential associated with the first content consumer and identifying a media content selection of the first content consumer;

identify, by the first node and using an instance of a distributed media rights transaction ledger, an availability of a media content item corresponding to the media content selection based on (i) one or more granted media content rights associated with the media content item and (ii) a unique cryptographic identifier corresponding to the content consumer credential;

retrieve, by the first node, one or more media content rights transactions of a plurality of media content rights transactions stored in the distributed media rights transaction ledger;

determine, by the first node and based on one or more of the one or more media content rights transactions, that ownership of the media content item is associated with a third node of the plurality of nodes, wherein determining the ownership of the media content item comprises at least verifying a cryptographic signature associated with the third node;

determine, by the first node and based on one or more of the one or more media content rights transactions, that the third node has granted, to a second node of the plurality of nodes, media content rights to distribute the media content item, wherein acquiring first media content rights associated with the media content item on behalf of the first content consumer from the second node takes less network time than acquiring the first media content rights from the third node based on the second node having been previously granted the media content rights to distribute the media content item by the third node;

acquire, by the first node and by negotiating with the second node, first media content rights associated with the media content item on behalf of the first content consumer; and responsive to acquiring the first media content rights associated with the media content item, (i) provide, by the first node and to the first consumer device, data indicative of the media content item;

(ii) generate, by the first node, a media content right transaction based on the unique cryptographic identifier and the media content item; and (iii) update, by the first node, the distributed media rights transaction ledger based on the media content right transaction.

17. The one or more non-transitory computer-readable storage media of claim 16, wherein the media content selection identifies a selection of the media content item from a unified library/custom catalog corresponding to the instance of the distributed media rights transaction ledger.

18. The one or more non-transitory computer-readable storage media of claim 17, wherein the unified library/custom catalog is generated, using the instance of the distributed media rights transaction ledger, based on a consumption pattern of the first content consumer.

19. The one or more non-transitory computer-readable storage media of claim 17, wherein the unified library/custom catalog comprises a collection of media content associated with the plurality of nodes.

20. The one or more non-transitory computer-readable storage media of claim 19, wherein the data indicative of the media content item comprises a link to the media content item from a media content master repository of the second node.

* * * * *